(12) United States Patent
Yabu

(10) Patent No.: US 9,762,951 B2
(45) Date of Patent: Sep. 12, 2017

(54) VIDEO RECEPTION DEVICE, ADDED-INFORMATION DISPLAY METHOD, AND ADDED-INFORMATION DISPLAY SYSTEM

(71) Applicant: Panasonic Intellectual Property Management Co., Ltd., Osaka (JP)

(72) Inventor: Hiroshi Yabu, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/787,759

(22) PCT Filed: Jul. 3, 2014

(86) PCT No.: PCT/JP2014/003546
§ 371 (c)(1),
(2) Date: Oct. 28, 2015

(87) PCT Pub. No.: WO2015/015712
PCT Pub. Date: Feb. 5, 2015

(65) Prior Publication Data
US 2016/0088340 A1    Mar. 24, 2016

(30) Foreign Application Priority Data

Jul. 30, 2013 (JP) ................................ 2013-157373

(51) Int. Cl.
*H04N 7/10* (2006.01)
*H04N 7/025* (2006.01)
(Continued)

(52) U.S. Cl.
CPC ....... *H04N 21/4316* (2013.01); *H04N 21/235* (2013.01); *H04N 21/237* (2013.01);
(Continued)

(58) Field of Classification Search
CPC ......... H04N 21/4316; H04N 21/23418; H04N 21/235; H04N 21/237; H04N 21/26233;
(Continued)

(56) References Cited

U.S. PATENT DOCUMENTS 7,712,123 B2    5/2010 Miyaoku et al.
8,199,221 B2    6/2012 Yoshizumi
(Continued)

FOREIGN PATENT DOCUMENTS

EP    1286541    2/2003
EP    1 954 041 A1    8/2008
(Continued)

OTHER PUBLICATIONS

International Search Report of PCT application No. PCT/JP2014/003546 dated Oct. 7, 2014.
(Continued)

*Primary Examiner* — Oleg Asanbayev
(74) *Attorney, Agent, or Firm* — McDermott Will & Emery LLP

(57) ABSTRACT

Additional information related to video signals input from an outside is obtained and superimposed on the video signals. Hence, video reception device which is configured to transmit and receive data through communication network includes input unit, video extraction unit, control unit and additional information display control unit. The control unit performs control of requesting video recognition device to perform video recognition processing on a partial video extracted by the video extraction unit, and obtaining a result of the video recognition processing and display control information of additional information from the video recognition device. The additional information display control unit performs control of calculating a display ending time of the additional information based on a system time at which
(Continued)

the video extraction unit extracts the partial video, and the display control information, and superimposing the additional information on the video signal based on the display ending time.

12 Claims, 14 Drawing Sheets

(51) Int. Cl.
    *H04N 21/431* (2011.01)
    *H04N 21/237* (2011.01)
    *H04N 21/488* (2011.01)
    *H04N 21/44* (2011.01)
    *H04N 21/81* (2011.01)
    *H04N 21/234* (2011.01)
    *H04N 21/235* (2011.01)
    *H04N 21/262* (2011.01)
    *H04N 21/8547* (2011.01)

(52) U.S. Cl.
    CPC .. *H04N 21/23418* (2013.01); *H04N 21/26233* (2013.01); *H04N 21/44008* (2013.01); *H04N 21/488* (2013.01); *H04N 21/812* (2013.01); *H04N 21/8133* (2013.01); *H04N 21/8547* (2013.01)

(58) Field of Classification Search
    CPC ........... H04N 21/44008; H04N 21/488; H04N 21/812; H04N 21/8133; H04N 21/8547; G06F 13/00
    See application file for complete search history.

(56) References Cited

U.S. PATENT DOCUMENTS

| | | | |
|---|---|---|---|
| 8,254,720 | B2 | 8/2012 | Matsuzaki |
| 8,421,921 | B1 | 4/2013 | Woodall |
| 8,582,952 | B2 | 11/2013 | Circlaeys et al. |
| 9,148,610 | B2 | 9/2015 | Yabu |
| 2002/0001453 | A1 | 1/2002 | Mizumura et al. |
| 2002/0097339 | A1 | 7/2002 | Kwon |
| 2002/0126990 | A1 | 9/2002 | Rasmussen et al. |
| 2002/0143902 | A1 | 10/2002 | Chung et al. |
| 2003/0051252 | A1 | 3/2003 | Miyaoku et al. |
| 2003/0084462 | A1 | 5/2003 | Kubota et al. |
| 2003/0149983 | A1 | 8/2003 | Markel |
| 2004/0165865 | A1 | 8/2004 | Seo et al. |
| 2005/0071425 | A1 | 3/2005 | Chung et al. |
| 2005/0172312 | A1 | 8/2005 | Lienhart et al. |
| 2006/0187358 | A1 | 8/2006 | Lienhart et al. |
| 2006/0200842 | A1 | 9/2006 | Chapman et al. |
| 2007/0157242 | A1 | 7/2007 | Cordray et al. |
| 2007/0233285 | A1 | 10/2007 | Yamamoto |
| 2007/0261079 | A1 | 11/2007 | Pack et al. |
| 2008/0181515 | A1 | 7/2008 | Kondo |
| 2008/0310731 | A1 | 12/2008 | Stojancic et al. |
| 2009/0006375 | A1 | 1/2009 | Lax et al. |
| 2009/0034937 | A1 | 2/2009 | Kusunoki et al. |
| 2009/0177758 | A1 | 7/2009 | Banger et al. |
| 2009/0244372 | A1 | 10/2009 | Petronelli et al. |
| 2009/0279738 | A1 | 11/2009 | Sasaki |
| 2010/0067873 | A1 | 3/2010 | Sasaki et al. |
| 2010/0259684 | A1 | 10/2010 | Kambe |
| 2010/0318515 | A1 | 12/2010 | Ramanathan et al. |
| 2011/0078202 | A1 | 3/2011 | Kamibeppu |
| 2011/0135283 | A1 | 6/2011 | Poniatowki et al. |
| 2011/0137976 | A1 | 6/2011 | Poniatowski et al. |
| 2011/0181693 | A1 | 7/2011 | Lee et al. |
| 2011/0243474 | A1 | 10/2011 | Ito |
| 2011/0246202 | A1 | 10/2011 | McMillan et al. |
| 2012/0020568 | A1 | 1/2012 | Kogane |
| 2012/0075421 | A1 | 3/2012 | Tsukagoshi |
| 2012/0092248 | A1 | 4/2012 | Prabhala |
| 2012/0128241 | A1 | 5/2012 | Jung |
| 2012/0320091 | A1* | 12/2012 | Rajaraman ............. G06Q 30/02 345/629 |
| 2012/0321125 | A1 | 12/2012 | Choi et al. |
| 2013/0047178 | A1 | 2/2013 | Moon et al. |
| 2013/0054645 | A1 | 2/2013 | Bhagavathy et al. |
| 2013/0094590 | A1 | 4/2013 | Laksono et al. |
| 2013/0111514 | A1 | 5/2013 | Slavin et al. |
| 2013/0129219 | A1 | 5/2013 | Takenouchi et al. |
| 2013/0145395 | A1 | 6/2013 | Jeong et al. |
| 2013/0167189 | A1 | 6/2013 | Lucas |
| 2013/0198773 | A1 | 8/2013 | Jentz et al. |
| 2013/0202150 | A1 | 8/2013 | Sinha et al. |
| 2013/0205321 | A1 | 8/2013 | Sinha et al. |
| 2013/0230292 | A1 | 9/2013 | Pierce et al. |
| 2013/0246457 | A1 | 9/2013 | Stojancic et al. |
| 2013/0247117 | A1 | 9/2013 | Yamada et al. |
| 2013/0254802 | A1 | 9/2013 | Lax et al. |
| 2013/0308818 | A1 | 11/2013 | MacIntosh et al. |
| 2014/0007155 | A1 | 1/2014 | Vemparala et al. |
| 2014/0082655 | A1 | 3/2014 | Moon et al. |
| 2014/0123204 | A1* | 5/2014 | Moon ...................... B05D 1/26 725/131 |
| 2014/0229485 | A1 | 8/2014 | Icho et al. |
| 2014/0230002 | A1 | 8/2014 | Kitazato |
| 2015/0020094 | A1 | 1/2015 | Moon et al. |
| 2015/0026718 | A1 | 1/2015 | Seyller |

FOREIGN PATENT DOCUMENTS

| | | |
|---|---|---|
| EP | 2337345 A1 | 6/2011 |
| EP | 2760200 A1 | 7/2014 |
| EP | 2763427 | 8/2014 |
| JP | H04-245552 A | 9/1992 |
| JP | H09-185720 A | 7/1997 |
| JP | H10-126721 A | 5/1998 |
| JP | 10-214258 | 8/1998 |
| JP | 2000-287189 A | 10/2000 |
| JP | 2000-293626 A | 10/2000 |
| JP | 2002-175311 A | 6/2002 |
| JP | 2002-209204 | 7/2002 |
| JP | 2002-232372 | 8/2002 |
| JP | 2002-334010 A | 11/2002 |
| JP | 2004-007323 A | 1/2004 |
| JP | 2004-104368 A | 4/2004 |
| JP | 2004-303259 | 10/2004 |
| JP | 2004-341940 A | 12/2004 |
| JP | 2005-167452 A | 6/2005 |
| JP | 2005-167894 A | 6/2005 |
| JP | 2005-347806 A | 12/2005 |
| JP | 2006-030244 A | 2/2006 |
| JP | 2006-303936 | 11/2006 |
| JP | 2007-049515 | 2/2007 |
| JP | 2007-134948 A | 5/2007 |
| JP | 2008-040622 | 2/2008 |
| JP | 2008-042259 A | 2/2008 |
| JP | 2008-116792 A | 5/2008 |
| JP | 2008-176396 A | 7/2008 |
| JP | 2008-187324 A | 8/2008 |
| JP | 2009-088777 | 4/2009 |
| JP | 2010-164901 A | 7/2010 |
| JP | 2010-271987 A | 12/2010 |
| JP | 2011-034323 A | 2/2011 |
| JP | 2011-059504 A | 3/2011 |
| JP | 2011-234343 | 11/2011 |
| JP | 2012-055013 A | 3/2012 |
| JP | 2012-231383 | 11/2012 |
| JP | 2013-070268 A | 4/2013 |
| JP | 2013-125191 A | 6/2013 |
| JP | 2013-164753 A | 8/2013 |
| WO | 2004/080073 A2 | 9/2004 |
| WO | 2007/039994 A1 | 4/2007 |
| WO | 2009/011030 A1 | 1/2009 |
| WO | 2010/022000 | 2/2010 |
| WO | 2013/042531 A1 | 3/2013 |
| WO | 2013/047948 | 4/2013 |

(56) References Cited

FOREIGN PATENT DOCUMENTS

| WO | 2013/103273 A1 | 7/2013 |
|---|---|---|
| WO | 2013/119082 A1 | 8/2013 |
| WO | 2014/006903 A1 | 1/2014 |

OTHER PUBLICATIONS

The Extended European Search Report dated Jun. 14, 2016 for the related European Patent Application No. 14832570.7.
Non-Final Office Action issued in U.S. Appl. No. 14/787,721, mailed on Aug. 4, 2016.
Final Office Action issued in U.S. Appl. No. 14/787,721, mailed on Dec. 2, 2016.
Non-Final Office Action issued in U.S. Appl. No. 14/888,444, mailed on Oct. 6, 2016.
Non-Final Office Action issued in U.S. Appl. No. 14/888,447, mailed on Sep. 6, 2016.
Final Office Action issued in U.S. Appl. No. 14/888,447, mailed on Jan. 10, 2017.
Non-Final Office Action issued in U.S. Appl. No. 14/888,449, mailed on Nov. 21, 2016.
Non-Final Office Action issued in U.S. Appl. No. 14/888,445, mailed on Aug. 12, 2016.
Non-Final Office Action issued in U.S. Appl. No. 14/890,121, mailed on Sep. 14, 2016.
The Extended European Search Report dated Jul. 5, 2016 for the related European Patent Application No. 14829140.4.
The Extended Search Report dated Jul. 8, 2016 for the related Europena Patent Application No. 14838764.0.
The Extended European Search Report dated Jul. 19, 2016, for the related European Patent Application No. 14838765.7.
International Search Report of PCT application No. PCT/JP2014/003526 dated Oct. 7, 2014 (with English ranslation).
International Search Report issued in International Patent Application No. PCT/JP2014/003548, dated Oct. 7, 2014 (with English translation).
International Search Report of International Patent Application No. PCT/JP2014/003761, dated Oct. 21, 2014 (with English translation).
International Search Report of International Patent Application No. PCT/JP2014/003762, dated Oct. 21, 2014 (with English translation).
International Search Report of International Patent Application No. PCT/JP2014/003547, dated Oct. 7, 2014 (with English translation).
International Search Report of International Patent Application No. PCT/JP2014/003760, dated Oct. 7, 2014 (with English translation).
International Search Report of International Patent Application No. PCT/JP2015/004112, dated Oct. 27, 2015 (with English translation).
International Search Report of International Patent Application No. PCT/JP2015/003527, dated Aug. 11, 2015 (with English translation).
International Search Report of International Patent Application No. PCT/JP2015/004187, dated Oct. 20, 2015 (with English translation).
Gonzales R et al: "Digital Image Processing, Matching by correlation", Dec. 31, 2002 (Dec. 31, 2002), Digital Image Processing, Prentice-Hall Upper Saddle River, New Jersey, pp. 701-704, XP002657364.
Template matching, Wikipedia, Mar. 11, 2013 (Mar. 11, 2013), XP002759268, Retrieved from the Internet: URL:htttps://en.wikipedia.org/w/index.php?title=Template_matching&oldid=543510371 [retrieved on-Jun. 28, 2016].
Final Office Action issued in U.S. Appl. No. 14/888,449, mailed on Mar. 6, 2017.
The Extended European Search Report dated Feb. 28, 2017 for the related European Patent Application No. 14841401.4.
The Extended European Search Report dated Mar. 3, 2017 for the related European Patent Application No. 14841377.6.
Final Office Action issued in U.S. Appl. No. 14/888,445, mailed on Jan. 30, 2017.
Final Office Action issued in U.S. Appl. No. 14/890,121, mailed on Mar. 13, 2017.
Non-Final Office Action issued in related U.S. Appl. No. 13/958,863, mailed on Aug. 14, 2014.
Final Office Action issued in related U.S. Appl. No. 13/958,863, mailed on Jan. 23, 2015.
Non-Final Office Action issued in U.S. Appl. No. 14/787,721, dated Jun. 7, 2017.
Final Office Action issued in U.S. Appl. No. 14/888,444, dated May 15, 2017.
Non-Final Office Action issued in U.S. Appl. No. 14/888,445, dated Jun. 9, 2017.
Notice of Allowance issued in U.S. Appl. No. 14/888,447, dated Jul. 3, 2017.
Non-Final Office Action issued in U.S. Appl. No. 14/888,449, dated Jul. 5, 2017.
The Extended European Search Report dated May 29, 2017 for the related European Patent Application No. 15832982.1.
The Extended European Search Report dated May 11, 2017 for the related European Patent Application No. 15822221.6.

\* cited by examiner

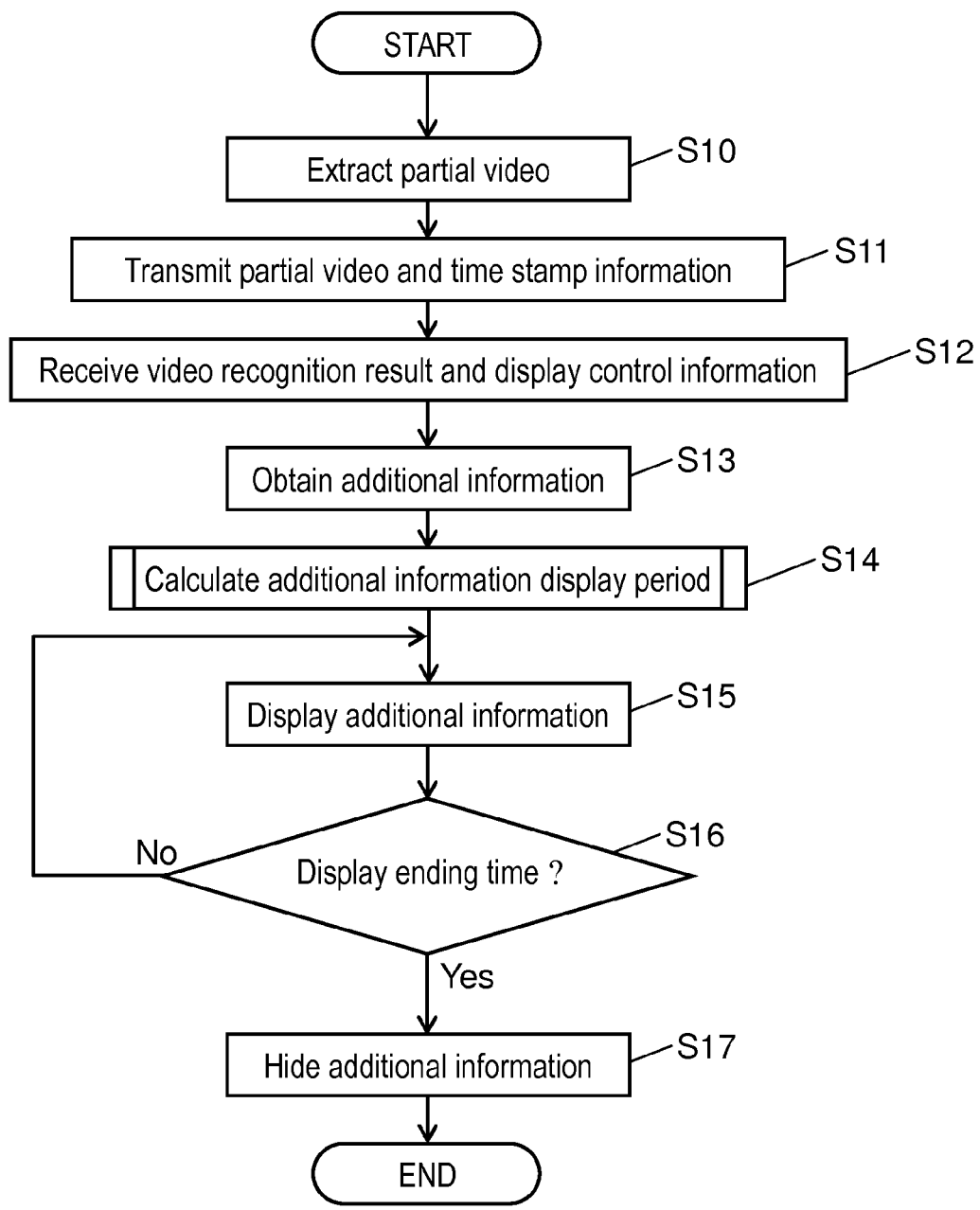

US 9,762,951 B2

VIDEO RECEPTION DEVICE, ADDED-INFORMATION DISPLAY METHOD, AND ADDED-INFORMATION DISPLAY SYSTEM

CROSS-REFERENCE TO RELATED APPLICATIONS

This application is a U.S. national stage application of the PCT International Application No. PCT/JP2014/003546 filed on Jul. 3, 2014, which claims the benefit of foreign priority of Japanese patent application 2013-157373 filed on Jul. 30, 2013, the contents all of which are incorporated herein by reference.

TECHNICAL FIELD

The present disclosure relates to a video reception device which obtains additional information related to video signals input from an outside, and superimposes the additional information on the video signals.

BACKGROUND ART

Patent Literature 1 has disclosed a data processing system. In this system, a client device has transmitted video data to a server device which is a video recognition device through a network, and requested the server device to perform video recognition processing. The server device has performed video recognition based on the received video data, and transmitted a video recognition result to the client device through the network.

CITATION LIST

Patent Literature

PTL 1: Unexamined Japanese Patent Publication No. H10-214258

SUMMARY

The present disclosure provides a video reception device, an additional information display method and an additional information display system which are effective to perform control of obtaining additional information related to video signals input from an outside, and superimposing the obtained additional information on the video signals.

The video reception device according to the present disclosure is configured to transmit and receive data through a communication network, and includes an input unit, a video extraction unit, a control unit and an additional information display control unit. The input unit is configured to receive an input of a video signal output from a video transmission device installed outside. The video extraction unit is configured to extract a partial video for video recognition processing, from the video signal. The control unit is configured to perform control of transmitting the partial video to a video recognition device connected to the communication network so as to request the video recognition device to perform the video recognition processing, obtaining a result of the video recognition processing and display control information of additional information from the video recognition device, and obtaining additional information based on the result of the video recognition processing from an additional information distribution device connected to the communication network. The additional information display control unit is configured to perform control of calculating a display ending time or a display remaining time of the additional information based on a system time at which the video extraction unit extracts the partial video, and the display control information, and superimposing the additional information on the video signal based on the display ending time or the display remaining time.

An additional information display method according to the present disclosure is an additional information display method of a video reception device configured to transmit and receive data through a communication network, and includes:

extracting a partial video for video recognition processing, from a video signal input from an outside;

transmitting the partial video to a video recognition device connected to the communication network so as to request the video recognition device to perform the video recognition processing, and obtaining a result of the video recognition processing and display control information of additional information, from the video recognition device;

obtaining additional information based on the result of the video recognition processing, from an additional information distribution device connected to the communication network;

calculating a display ending time or a display remaining time of the additional information based on a system time at which the partial video is extracted, and the display control information; and performing control of superimposing the additional information on the video signal based on the display ending time or the display remaining time.

An additional information display system according to the present disclosure includes a video reception device, a video recognition device and an additional information distribution device configured to transmit and receive data to each other through a communication network. The video reception device includes an input unit, a video extraction unit, a control unit and an additional information display control unit. The input unit is configured to receive an input of a video signal output from a video transmission device installed outside. The video extraction unit is configured to extract a partial video for video recognition processing, from the video signal. The control unit is configured to perform control of transmitting the partial video to a video recognition device through the communication network so as to request the video recognition device to perform the video recognition processing, obtaining a result of the video recognition processing and display control information of additional information from the video recognition device through the communication network, and obtaining additional information based on the result of the video recognition processing from an additional information distribution device through the communication network. The additional information display control unit is configured to perform control of calculating a display ending time or a display remaining time of the additional information based on a system time at which the video extraction unit extracts the partial video, and the display control information, and superimposing the additional information on the video signal based on the display ending time or the display remaining time. The video recognition device is configured to receive the partial video transmitted from the video reception device through the communication network, perform the video recognition processing using the partial video, and output the result of the video recognition processing and the display control information to the video reception device through the communication network. The additional information distribution device is configured to transmit additional information corresponding to the result of the video recognition processing received through the communication network, to the video reception device through the communication network.

BRIEF DESCRIPTION OF DRAWINGS

FIG. 4 is a flowchart schematically illustrating an operation of additional information display control performed by the video reception device according to the first exemplary embodiment.

DESCRIPTION OF EMBODIMENTS

Exemplary embodiments will be described in detail below optionally with reference to the drawings. However, the exemplary embodiments will not be described in detail more than necessary in some cases. For example, in some cases, matters which have already been well known will not be described in detail, and substantially same components will not be described again. This is to prevent the following description from being redundant more than necessary, and help one of ordinary skill in the art understand the following description.

In addition, the accompanying drawings and the following description are provided to make it easy for one of ordinary skill in the art to sufficiently understand the present disclosure, and do not intend to limit the subject matters recited in the claims.

First Exemplary Embodiment

The first exemplary embodiment will be described below with reference to FIGS. 1 to 7.

[1-1. Configuration]

[1-1-1. Outline of System Configuration]

Figure 1:
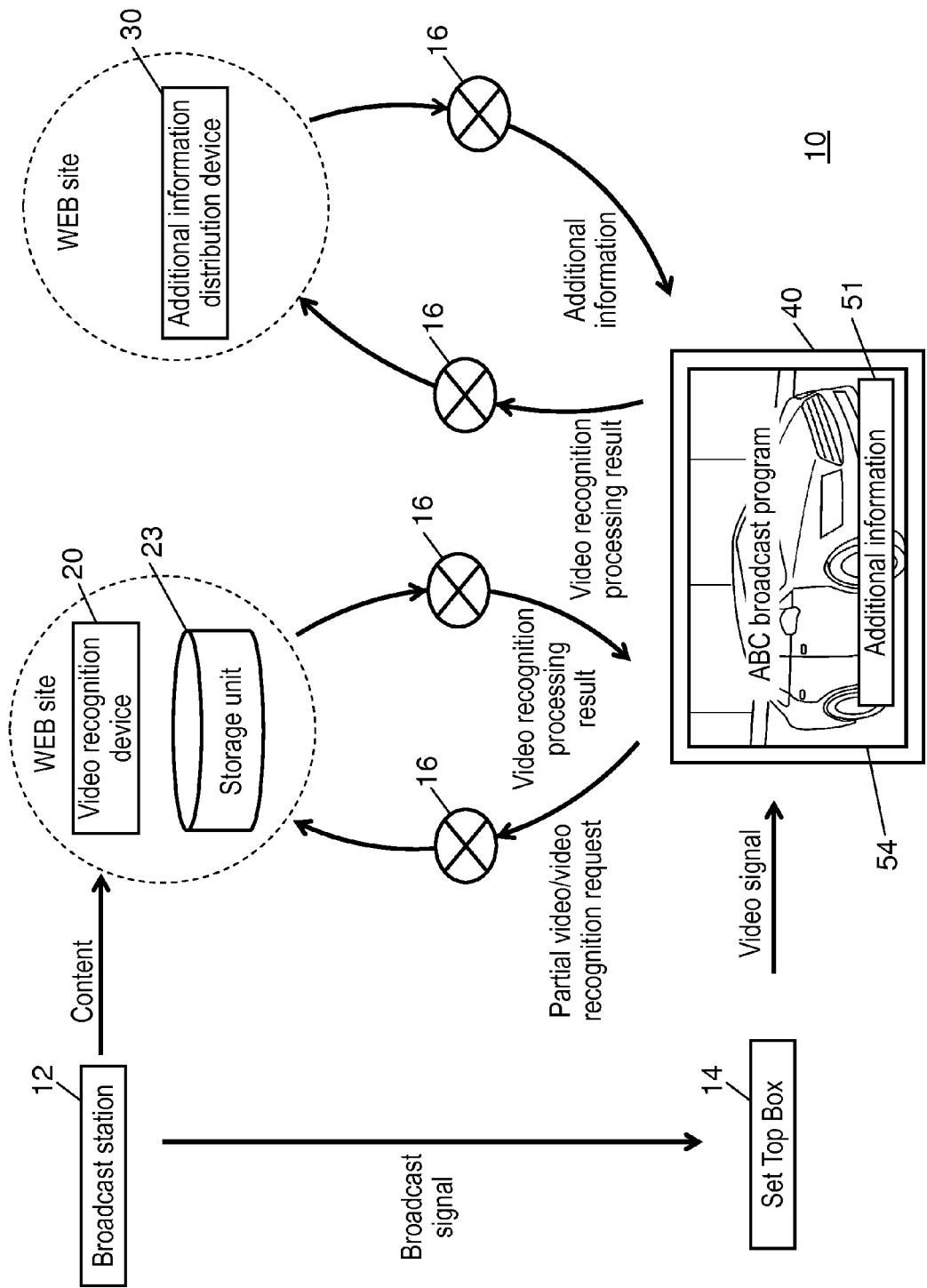
FIG. 1 is a view schematically illustrating an example of a configuration of an additional information display system according to a first exemplary embodiment.

FIG. 1 is a view schematically illustrating an example of a configuration of additional information display system 10 according to the first exemplary embodiment. Additional information display system 10 includes broadcast station 12, STB (Set Top Box) 14 which is a video transmission device, video recognition device 20, additional information distribution device 30 and video reception device 40. Additional information display system 10 is a communications system which is configured to specify which content a video received by video reception device 40 is, using a video recognition technique of video recognition device 20, obtain additional information related to the content from additional information distribution device 30, and display the additional information on video reception device 40.

Video reception device 40, video recognition device 20 and additional information distribution device 30 are connected with each other through communication network 16.

Communication network 16 is configured as a wired network, a wireless network or a combination of wired and wireless networks. Communication network 16 is, for example, the Internet, yet may be an intranet, a commercial line, other communication lines or a combination of the intranet, the commercial line and other communication lines.

Video reception device 40 and STB 14 are connected with each other through a communications interface. The communications interface is, for example, a HDMI (registered trademark) (High-Definition Multimedia Interface) yet may be a video cable or a wireless communications interface such as Wi-Fi (registered trademark), Bluetooth (registered trademark) or a wireless LAN (Local Area Network).

Broadcast station 12 is a transmission device which is configured to transmit (broadcast) broadcast signals. Broadcast station 12 broadcasts a television program including a main program and commercial messages (CM) by converting the television program into video signals, and superimposing the video signals on broadcast signals. The main program and the CMs are switched to each other as time passes. A main program and CMs will be referred to as "content" below. That is, broadcast station 12 broadcasts content which is switched as time passes. In addition, the transmission device is by no means limited to broadcast station 12, and only needs to transmit or broadcast content which is switched as time passes.

STB 14 is a receiver (tuner) which is configured to receive broadcast signals broadcast from broadcast station 12 and extract video signals from the broadcast signals. STB 14 may have a function of decoding the received video signals when, for example, broadcast station 12 broadcasts digital broadcast signals. STB 14 receives a channel selected from a plurality of channels broadcast by broadcast station 12 according to a user's instruction, and outputs video signals of this channel to video reception device 40 through the communications interface (e.g. the HDMI (registered trademark)). In addition, the video transmission device is by no means limited to STB 14, and may be a recording device or the like which has, for example, a recording function, a broadcast signal receiving function and a video signal output function.

Video reception device 40 is a video reception device which is configured to display, on displaying unit 54, a video based on video signals input from an outside, and is, for example, a television receiver. Video reception device 40 is connected to communication network 16, and can transmit and receive data to and from video recognition device 20 and additional information distribution device 30 through communication network 16.

Video reception device 40 according to the first exemplary embodiment is configured to perform the following operations. Video reception device 40 performs video recognition processing related to video signals input from the video transmission device (e.g. STB 14) through the communication network using video recognition device 20, and specifies content represented by these video signals. Further, video reception device 40 obtains additional information (e.g. advertisement information) related to the content from additional information distribution device 30, superimposes the obtained additional information on these video signals and displays the additional information on displaying unit 54.

More specifically, video reception device 40 cyclically extracts a partial video by cyclically clipping part of input video signals, and transmits the partial video, time stamp information obtained when the partial video is extracted, and a video recognition processing request (also referred to as a "video recognition request" below) to video recognition device 20 through communication network 16. Further, video reception device 40 obtains the video recognition processing result of the partial video and display control information of additional information from video recognition device 20 through communication network 16, and obtains additional information related to the obtained video recognition processing result from additional information distribution device 30 through communication network 16. Furthermore, video reception device 40 superimposes an image (indicated as "additional information 51" in FIG. 1) which is based on the obtained additional information, on a video which is being displayed on displaying unit 54, based on the display control information of the additional information obtained from video recognition device 20, and displays the additional information. The display control information of the additional information is information used to perform control of displaying/hiding to display the additional information on displaying unit 54, and includes, for example, information indicating a display period of the additional information. Details of the above will be described later.

In addition, in the present exemplary embodiment, a time managed by video reception device 40 is referred to as a "system time". Further, a system time at which video reception device 40 performs some operation is referred to as a "time stamp". For example, the above time stamp obtained when the partial video is extracted refers to a system time at which video reception device 40 extracts the partial video. Further, time stamp information refers to information (or data) indicating the system time.

In addition, the time managed by video reception device 40 and the time managed by video recognition device 20 are desirably synchronized with each other (both of the times come to the top of the hour (00 minute of every hour) at the substantially same time).

In addition, in the present exemplary embodiment, an example where additional information is "advertisement information related to content" will be described. However, the additional information is by no means limited to advertisement information and may be, for example, tourist information, history information, personal profile information, a URL (Uniform Resource Locator), public bulletin information, information related to a program which is being broadcast and social information such as Twitter (registered trademark).

Video recognition device 20 is a server device connected to communication network 16, and is a website which performs content specifying processing based on video recognition processing. The content specifying processing is processing of performing video recognition processing on a received partial video, and specifying content represented by the partial video based on the video recognition processing result. Hence, video recognition device 20 analyzes the content broadcast by broadcast station 12, and performs video recognition processing using this analysis result.

Video recognition device 20 obtains substantially all items of contents broadcast from broadcast station 12. Further, video recognition device 20 analyzes the obtained content, checks a time, a volume, a broadcast format, details, a genre, characters, a time table or the like of the content, and creates analysis information. Furthermore, video recognition device 20 creates a fingerprint from video signals of the content obtained from broadcast station 12. This fingerprint is information for recognizing a video, and is, for example, a hash value of each image which configures a moving image. Video recognition device 20 may obtain content by receiving broadcast signals broadcast from the broadcast station, or may obtain content by receiving video signals transmitted from broadcast station 12 through a dedicated video line or the like. Further, this analysis may be performed, for example, automatically or manually by an operator. Analysis information which is an analysis result of each content and a fingerprint are stored in storage unit 23 of video recognition device 20 per video of each content (e.g. video signals of a plurality of frames).

When receiving a video recognition request accompanied by a partial video transmitted from video reception device 40 and time stamp information obtained when the partial video is extracted, through communication network 16, video recognition device 20 cross-checks a fingerprint generated from the partial video and fingerprints generated in advance by video recognition device 20 and stored in storage unit 23, performs video recognition processing on this partial video and specifies the content corresponding to this partial video. Thus, video recognition device 20 performs content specifying processing of determining what content video the partial video transmitted from video reception device 40 is, and specifying the content. Further, video recognition device 20 reads an analysis result (analysis information) related to the specified content from storage unit 23, and returns the read information as the video recognition processing result to video reception device 40 through communication network 16. Furthermore, when returning the video recognition processing result to video reception device 40, video recognition device 20 returns display control information of additional information, too together with the video recognition processing result.

Video recognition processing based on such a method (content specifying processing based on video recognition processing) will be also referred to as "ACR (Automatic Content Recognition)".

Additional information distribution device 30 is a server device connected to communication network 16, and is a website (advertisement distribution site) which holds and distributes advertisement information of various commercial goods. When receiving the video recognition processing result (analysis information based on the video recognition processing result which video reception device 40 obtains from video recognition device 20) transmitted from video reception device 40 through communication network 16, additional information distribution device 30 transmits additional information related to this video recognition processing result (analysis information) to video reception device 40 through communication network 16. This additional information is, for example, advertisement information related to content specified by video recognition processing.

[1-1-2. Configurations of Video Recognition Device and Video Reception Device]

Figure 2:
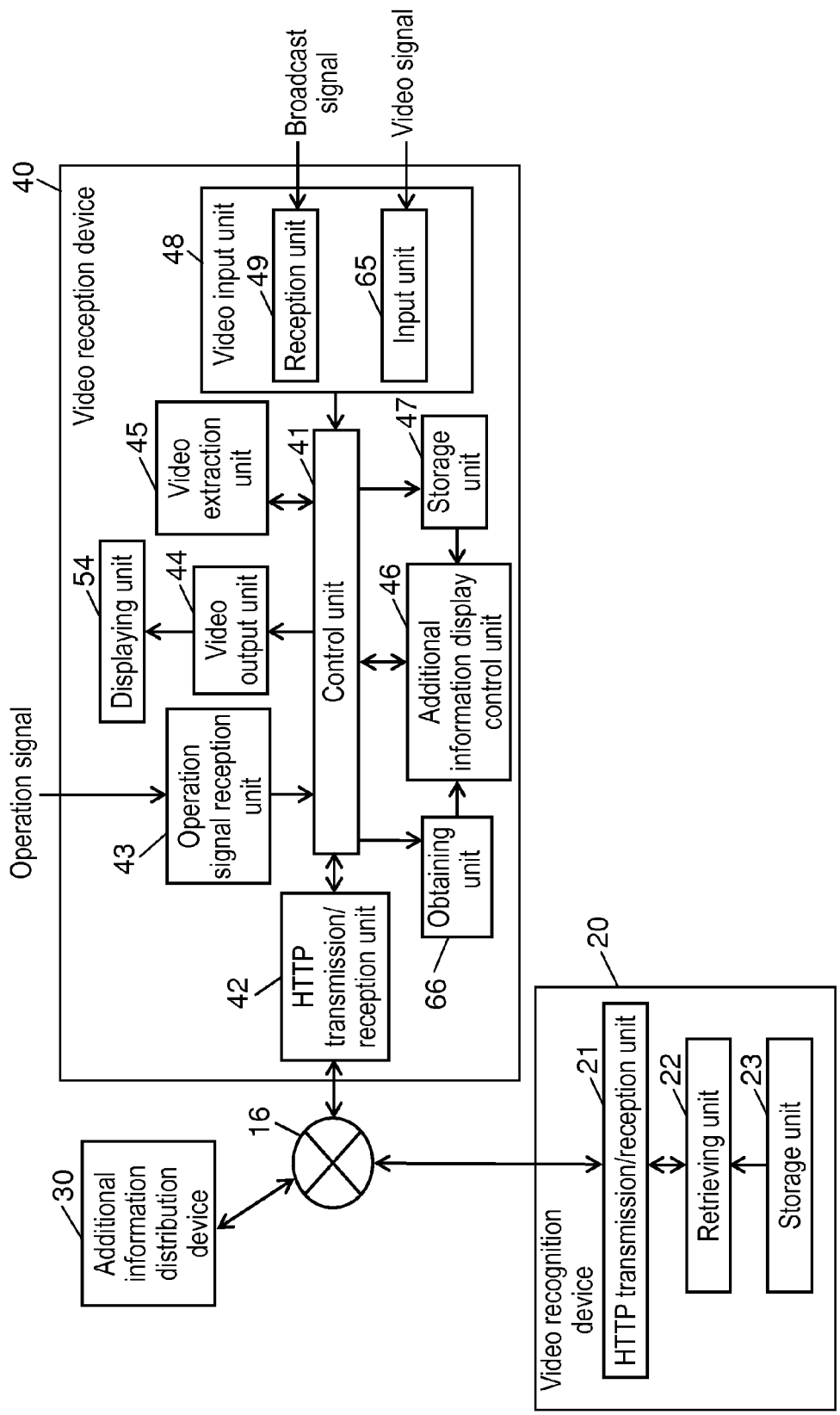
FIG. 2 is a block diagram schematically illustrating an example of configurations of a video recognition device and a video reception device according to the first exemplary embodiment.

FIG. 2 is a block diagram schematically illustrating an example of configurations of video recognition device 20 and video reception device 40 according to the first exemplary embodiment.

In addition, FIG. 2 illustrates a main circuit block related to an operation described in the present exemplary embodiment, and does not illustrate functions and circuit blocks related to other operations for ease of understanding of the operations described in the present exemplary embodiment. Further, each circuit block illustrated in FIG. 2 may be configured as an independent circuit. Alternatively, each circuit block may be configured such that a program created to realize one or a plurality of circuit blocks illustrated in FIG. 2 is executed by a processor.

Video recognition device 20 is a server device which includes HTTP (Hypertext Transfer Protocol) transmission/reception unit 21, retrieving unit 22 and storage unit 23. Video recognition device 20 is configured to provide service of content specifying processing based on video recognition processing, to video reception device 40 through communication network 16.

HTTP transmission/reception unit 21 is an interface for communication, and is, for example, a communications adapter which is adapted to standards of the Ethernet (registered trademark). HTTP transmission/reception unit 21 is configured to transmit and receive data to and from video reception device 40 through communication network 16.

Storage unit 23 is a storage device which is configured by, for example, a HDD (Hard Disk Drive). Storage unit 23 is configured to associate a fingerprint of content broadcast from broadcast station 12, and analysis information of an analysis result of the content with the content to store. This fingerprint is, for example, a hash value of each image which configures a moving image.

Storage unit 23 associates fingerprints and analysis results (analysis information) of, for example, all channels (e.g. 300 channels) broadcast from broadcast station 12 to store per content (e.g. a main program or a CM) with a slight time delay (e.g. 10 seconds) from a start of a broadcast. This analysis result (analysis information) may include, for example, a program title, a CM title, a program outline, a CM outline, characters, a place related to a video, and a URL. Further, when it is possible to superimpose additional information on a video (content video) displayed on displaying unit 54 of video reception device 40 and display the additional information, information indicating a display period of the additional information is also stored.

Retrieving unit 22 is configured to, when receiving a video recognition request accompanied by the partial video and the time stamp information transmitted from video reception device 40 through HTTP transmission/reception unit 21, perform content specifying processing based on video recognition processing using the partial video, and return the result (analysis information) and display control information of additional information to video reception device 40 through HTTP transmission/reception unit 21. In the present exemplary embodiment, a result of content specifying processing based on video recognition processing using a partial video will be also referred to simply as a "video recognition processing result".

More specifically, retrieving unit 22 receives the video recognition request accompanied by the partial video and the time stamp information transmitted from video reception device 40, through communication network 16 and HTTP transmission/reception unit 21. Next, retrieving unit 22 generates a fingerprint of the received partial video (e.g. a hash value of each image which configures the partial video), cross-checks the generated fingerprint and the fingerprints stored in storage unit 23, and retrieves a fingerprint corresponding to the received partial video (video recognition processing). Further, retrieving unit 22 specifies the content corresponding to the fingerprint specified based on this retrieval result as content corresponding to the received partial video (content specifying processing). Thus, retrieving unit 22 specifies the content corresponding to the received partial video. Further, retrieving unit 22 reads the analysis result (analysis information) associated with the specified content from storage unit 23, and returns the read analysis result as the video recognition processing result to video reception device 40 through HTTP transmission/reception unit 21 and communication network 16.

Furthermore, retrieving unit 22 returns display control information of additional information, too together with the video recognition processing result, to video reception device 40. This display control information of the additional information includes information indicating a display period of the additional information, and information indicating an offset time. The information indicating the offset time is information indicating a time difference between a start time of content managed by video recognition device 20 and a partial video (time stamp information obtained when the partial video is extracted). As described later, video reception device 40 performs an operation of calculating a display ending time of the additional time, and uses the information indicating the display period of this additional information and the information indicating the offset time to perform this operation. Details of the above will be described later.

Video reception device 40 includes control unit 41, HTTP transmission/reception unit 42, operation signal reception unit 43, video output unit 44, displaying unit 54, video extraction unit 45, additional information display control unit 46, storage unit 47, obtaining unit 66 and video input unit 48. Video reception device 40 is configured to perform content specifying processing based on video recognition processing using video recognition device 20, obtain analysis information which is the video recognition processing result from video recognition device 20, obtain additional information (e.g. advertisement information) related to the analysis information from additional information distribution device 30, superimpose an image of the additional information (e.g. the advertisement information related to a video) on the video (content) of the received video signals and display the additional information on displaying unit 54.

HTTP transmission/reception unit 42 is an interface for communication, and is, for example, a communications adapter which is adapted to standards of the Ethernet (registered trademark). HTTP transmission/reception unit 42 is configured to transmit and receive data to and from video recognition device 20 through communication network 16.

Operation signal reception unit 43 is configured to receive an operation signal (an operation signal for video reception device 40) output from an operation unit (not illustrated) such as a remote control device (abbreviated as a "remote controller" below) which has received a user's operation. Operation signal reception unit 43 may be configured to receive a signal output from the remote controller including a gyro sensor based on a physical fluctuation of this remote controller.

Video input unit 48 is a reception circuit and a decoder, and includes reception unit 49 which is configured to receive broadcast signals broadcast from the broadcast station, and input unit 65 which is configured to receive an input of video signals output from the video transmission device (e.g. STB 14). Video signals received by video input unit 48 include content (e.g. a main program and CMs) switched as time passes.

Reception unit 49 is configured to receive broadcast signals transmitted from broadcast station 12, through an antenna (not illustrated) or the like.

Input unit 65 is an interface which is configured to receive an input of video signals output from the video transmission device installed outside. Input unit 65 is configured to adapt to, for example, the standards of the HDMI (registered trademark), and can receive video signals transmitted from the video transmission device through the HDMI (registered trademark). This video transmission device is, for example, STB 14 yet may be a video recording/playback device or the like. Further, the input unit may be configured to receive video signals transmitted through a video cable and video signals transmitted by wireless communication.

Video output unit 44 has a function of controlling displaying unit 54, and is configured to control displaying unit 54 based on the video signals input from video input unit 48 and display a video based on the video signals on displaying unit 54. When receiving an input of additional information from control unit 41, video output unit 44 superimposes an image based on the additional information, on the video which is being displayed on displaying unit 54.

Displaying unit 54 is a display which is configured to display a video based on video signals, and is, for example, a LCD (Liquid Crystal Display). However, the present exemplary embodiment is by no means limited to this configuration. Displaying unit 54 may be a PDP (Plasma Display Panel), an OLED (Organic Electro Luminescence Display) or the like.

Additional information display control unit 46 is configured to perform control of displaying additional information. More specifically, additional information display control unit 46 is configured to determine whether or not to display the additional information on displaying unit 54, and output to control unit 41, for example, an instruction to display the additional information on displaying unit 54, an instruction to continuously display the additional information which is being displayed on displaying unit 54, and an instruction to hide the additional information which is being displayed on displaying unit 54 based on this determination.

Additional information display control unit 46 performs video recognition processing (content specifying processing based on the video recognition processing) based on a partial video extracted by video extraction unit 45 using video recognition device 20. Further, additional information display control unit 46 obtains a system time from control unit 41. Furthermore, additional information display control unit 46 determines whether or not to display the additional information obtained from additional information distribution device 30, on displaying unit 54 based on the video recognition processing result obtained from video recognition device 20 (whether or not to superimpose the additional information on video signals), and output an instruction based on this determination to control unit 41. Still further, additional information display control unit 46 calculates a display ending time of the additional information based on the display control information of the additional information obtained together with the video recognition processing result from video recognition device 20, and the system time obtained from control unit 41. Moreover, additional information display control unit 46 determines whether to continuously display or hide the additional information which is being displayed on displaying unit 54, based on the calculated display ending time of the additional information and a current system time, and outputs an instruction based on this determination to control unit 41.

In addition, additional information display control unit 46 may be configured to generate a fingerprint (e.g. a hash value of each image which configures a partial image) from the partial image extracted by video extraction unit 45, and perform video recognition processing based on the generated fingerprint using video recognition device 20.

Video extraction unit 45 is configured to extract a partial video from the video signals input from video input unit 48. Video extraction unit 45 is configured to extract from video signals a partial video of a predetermined period of time which is part of the video signals at a predetermined cycle. When, for example, the predetermined cycle is 3 seconds and a predetermined period of time is 3 seconds, video extraction unit 45 repeats an operation of extracting a partial video of 3 seconds from the video signals every 3 second. That is, video extraction unit 45 repeats an operation of continuously extracting a partial video of 3 seconds from the video signals every 3 second without a pause. Further, when, for example, the predetermined cycle is 15 seconds and a predetermined period of time is 3 seconds, video extraction unit 45 repeats an operation of extracting a partial video of 3 seconds from the video signals every 15 second. That is, video extraction unit 45 repeats an operation of extracting a partial video of 3 seconds from the video signals at intervals of 12 second. In addition, a partial video to be extracted from video signals may not be extracted in units of seconds, and, for example, may be extracted in units of a predetermined number of frames at a video frame rate.

Storage unit 47 is a storage device which is configured by, for example, a non-volatile memory. Storage unit 47 stores, for example, program meta information such as an electronic program guide (EPG) received by video input unit 48, the additional information and the display control information of the additional information obtained from video recognition device 20 and additional information distribution device 30 through HTTP transmission/reception unit 42, and the display ending time of the additional information calculated by additional information display control unit 46.

Control unit 41 is configured to control each circuit block included in video reception device 40. Control unit 41 employs a configuration including, for example, a non-volatile memory such as a ROM which stores programs (e.g. applications), a CPU which executes the programs, and a volatile memory such as a RAM which temporarily stores data, parameters and the like when the CPU executes a program.

Control unit 41 performs, for example, the following control. Control unit 41 controls video extraction unit 45 such that video extraction unit 45 extracts a partial video from video signals at predetermined cycles. Further, control unit 41 controls each circuit block to, every time video extraction unit 45 extracts a partial video, transmit the extracted partial video and time stamp information together with a video recognition request to video recognition device 20 through HTTP transmission/reception unit 42 and communication network 16 so as to request video recognition device 20 to perform the video recognition processing on this partial video. Furthermore, control unit 41 controls each circuit block to obtain the video recognition processing result of this partial video and display control information of additional information from video recognition device 20 through communication network 16 and HTTP transmission/reception unit 42, and obtain additional information based on the video recognition processing result from additional information distribution device 30 through communication network 16 and HTTP transmission/reception unit 42. Still further, control unit 41 controls each circuit block to store the obtained additional information in storage unit 47, output the additional information to video output unit 44, superimpose the additional information on a video which is being displayed on displaying unit 54 and display the additional information. In this case, control unit 41 controls each circuit block to hide the additional information which is being displayed on displaying unit 54 when additional information display control unit 46 determines to "hide the additional information".

In addition, additional information display system 10 may be configured such that, when video reception device 40 requests video recognition device 20 to perform video recognition processing, video reception device 40 creates a signal (data) indicating a video recognition processing request, and transmits this signal as the video recognition request to video recognition device 20. However, for example, a rule may be set between video reception device 40 and video recognition device 20 such that transmitting a partial video from video reception device 40 to video recognition device 20 is to request video recognition device 20 to perform video recognition processing instead of transmitting such a signal (data).

Obtaining unit 66 obtains the display control information of the additional information from video recognition device 20 through communication network 16 and HTTP transmission/reception unit 42.

Next, an outline of display control of additional information performed by additional information display control unit 46 will be described with reference to FIGS. 3A and 3B.

Figure 3A:
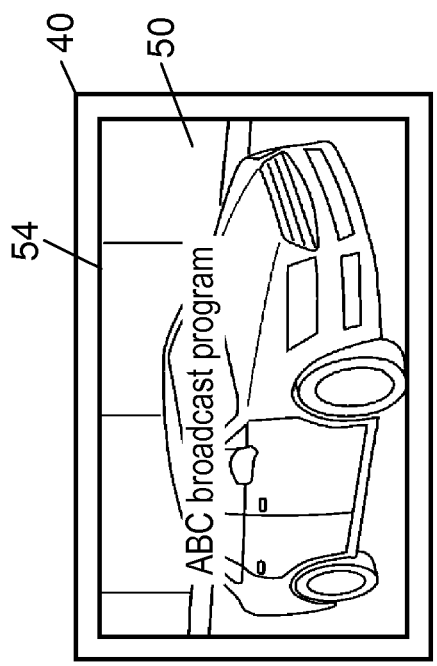
FIG. 3A is a view schematically illustrating an example of a video displayed on a displaying unit of the video reception device according to the first exemplary embodiment.

FIG. 3A is a view schematically illustrating an example of a video displayed on displaying unit 54 of video reception device 40 according to the first exemplary embodiment. FIG. 3B is a view schematically illustrating another example of a video displayed on displaying unit 54 of video reception device 40 according to the first exemplary embodiment.

FIG. 3A illustrates an example where video 50 based on video signals input from STB 14 to input unit 65 is displayed as is on displaying unit 54. In addition, FIG. 3A illustrates an example where an "ABC broadcast program" is displayed as an example of video 50.

Figure 3B:
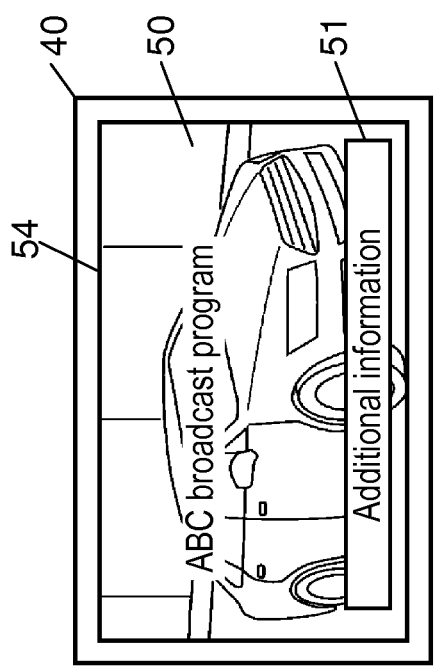
FIG. 3B is a view schematically illustrating another example of a video displayed on a displaying unit of the video reception device according to the first exemplary embodiment.

FIG. 3B illustrates an example where a video obtained by superimposing on video 50 additional information 51 obtained from additional information distribution device 30 based on a video recognition processing result is displayed on displaying unit 54. In addition, additional information 51 illustrated in FIG. 3B is only an example of additional information. A display position, a display size or the like of additional information are by no means limited to a display position, a display size or the like of additional information 51 illustrated in FIG. 3B.

Additional information display control unit 46 controls whether to display or hide additional information 51 based on the display control information of the additional information obtained from video recognition device 20 and the system time of video reception device 40. Details of display control of additional information 51 will be described later.

[1-2. Operation]

An operation of video reception device 40 configured as described above will be described with reference to FIGS. 4 to 11.

As described above, when receiving an input of video signals output from the video transmission device such as STB 14, video reception device 40 performs video recognition processing on the video signals using video recognition device 20. Video reception device 40 obtains display control information of additional information, together with the video recognition processing result, from video recognition device 20. The display control information of the additional information will be also referred to simply as "display control information" below. Further, video reception device 40 obtains additional information 51 (e.g. advertisement information) related to the video recognition processing result from additional information distribution device 30, superimposes obtained additional information 51 on these video signals and displays the additional information on displaying unit 54.

Video reception device 40 calculates a display ending time of the additional information based on the obtained display control information. Further, video reception device 40 hides additional information 51 (e.g. advertisement information) which is being displayed on displaying unit 54, based on the calculated display ending time of the additional information and the system time of video reception device 40. The display ending time of the additional information will be also referred to simply as a "display ending time" below.

An operation of calculating a display ending time based on display control information, and hiding advertisement information which is being displayed on displaying unit 54 based on the calculated display ending time will be described below.

[1-2-1. Operation of Additional Information Display Control]

FIG. 4 is a flowchart schematically illustrating an operation of additional information display control performed by video reception device 40 according to the first exemplary embodiment.

Video extraction unit 45 of video reception device 40 extracts a partial video from video signals output from STB 14 and input to input unit 65 (step S10).

Control unit 41 controls each circuit block to transmit the partial video extracted by video extraction unit 45 and the system time (time stamp information) of video reception device 40 at which the partial video is extracted, together with a video recognition request to video recognition device 20 through HTTP transmission/reception unit 42 and communication network 16 (step S11).

Control unit 41 controls each circuit block to receive a video recognition processing result (analysis information) which is a response to the request, and display control information of additional information from video recognition device 20 through communication network 16 and HTTP transmission/reception unit 42. Thus, control unit 41 recognizes what content is represented by the video signals input from STB 14 to input unit 65 (step S12).

Control unit 41 controls each circuit block to transmit information indicating the content determined in step S11, to additional information distribution device 30 through HTTP transmission/reception unit 42 and communication network 16. Further, control unit 41 controls each circuit block to obtain advertisement information related to the content, from additional information distribution device 30 through communication network 16 and HTTP transmission/reception unit 42. Control unit 41 controls each circuit block to store the obtained advertisement information in storage unit 47 (step S13). In this case, control unit 41 may control each circuit block to obtain the advertisement information related to the content from additional information distribution device 30 by designating a URL related to the content and accessing additional information distribution device 30. Control unit 41 may control each circuit block to obtain the advertisement information by designating this URL and accessing additional information distribution device 30 when, for example, analysis information obtained from video recognition device 20 includes the URL.

Next, additional information display control unit 46 calculates a display ending time of the additional information based on the obtained display control information. Further, additional information display control unit 46 stores the calculated display ending time in storage unit 47 (step S14). Processing of calculating a display ending time of additional information will be also referred to as "additional information display period calculation processing" below. Details of the additional information display period calculation processing will be described later.

Additional information display control unit 46 determines whether or not to display the advertisement information on displaying unit 54, based on the display control information. Control unit 41 instructs video output unit 44 to output the advertisement information to video output unit 44 based on an instruction from additional information display control unit 46, superimpose the advertisement information on content which is being displayed on displaying unit 54 and display the additional information (step S15). Thus, video output unit 44 superimposes the advertisement information on the content which is being displayed on displaying unit 54 and display the additional information. This advertisement information is advertisement information obtained from additional information distribution device 30 in step S13, and stored in storage unit 47.

Additional information display control unit 46 compares the display ending time calculated in step S14 and stored in storage unit 47 and a current system time, and determines whether or not the system time reaches the display ending time based on this comparison (step S16).

When it is determined in step S16 that the system time does not reach the display ending time (No), the flow returns to step S15, and additional information display control unit 46 instructs control unit 41 to continue outputting the advertisement information to video output unit 44. Control unit 41 controls video output unit 44 based on this instruction, and thereby video output unit 44 continues displaying the advertisement information.

When it is determined in step S16 that the system time reaches the display ending time (Yes), additional information display control unit 46 instructs control unit 41 to stop outputting the advertisement information to video output unit 44, and hide the advertisement information. Thus, control unit 41 instructs video output unit 44 to hide the advertisement information. According to this instruction, video output unit 44 hides the advertisement information which is being displayed on displaying unit 54. Consequently, displaying unit 54 displays a video (a video of content on which the advertisement information is not superimposed) based on video signals (step S16). Further, the flow returns to step S10, and video reception device 40 repeats a series of these operations.

Next, the additional information display period calculation processing in step S14 will be described.

[1-2-2. Operation of Additional Information Display Period Calculation Processing]

Figure 5:
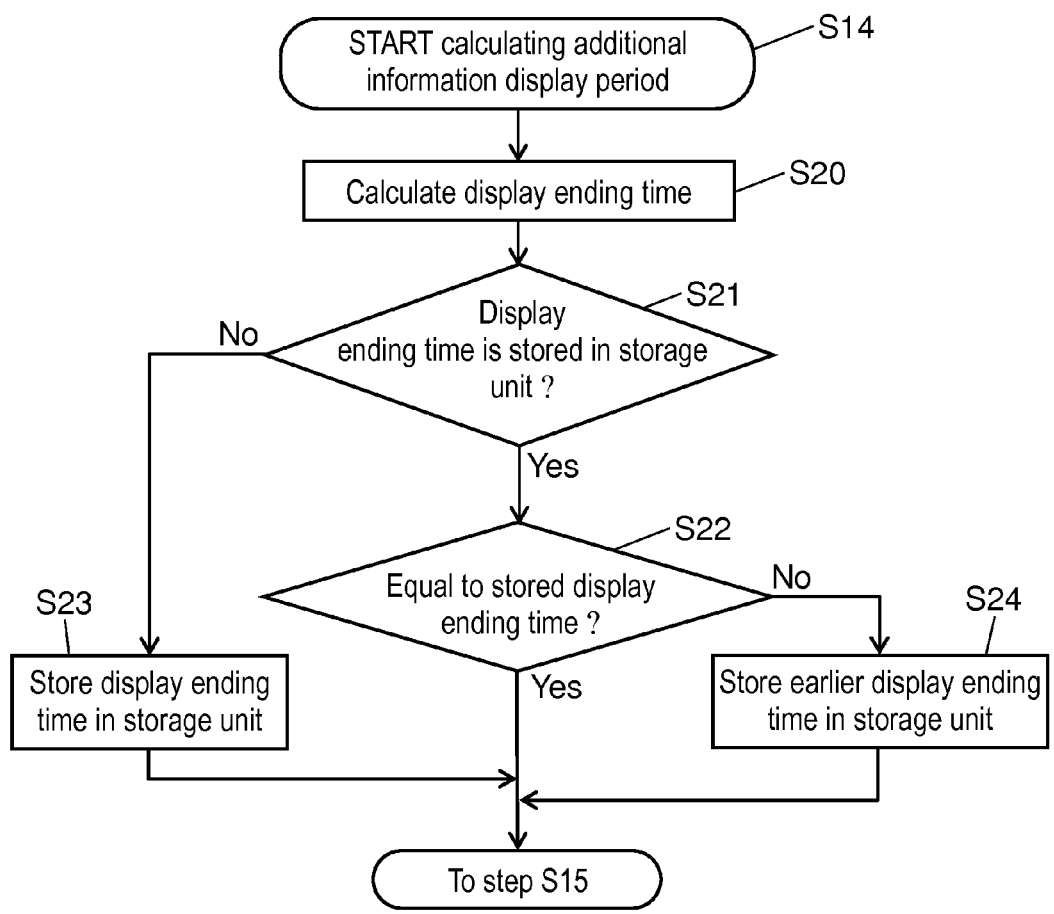
FIG. 5 is a flowchart schematically illustrating an operation of additional information display period calculation processing performed by the video reception device according to the first exemplary embodiment.

FIG. 5 is a flowchart schematically illustrating an operation of the additional information display period calculation processing performed by video reception device 40 according to the first exemplary embodiment.

Additional information display control unit 46 calculates a display ending time of additional information using the display control information obtained from video recognition device 20 and the system time (time stamp information) transmitted to video recognition device 20 when this display control information is obtained (step S20). A method of calculating a display ending time of additional information will be described later.

Next, additional information display control unit 46 checks whether or not the calculated display ending time of the additional information is stored in storage unit 47 (step S21).

When it is determined in step S21 that the display ending time of the additional information is not stored in storage unit 47 (No), additional information display control unit 46 stores in storage unit 47 the display ending time of the additional information calculated in step S20 (step S23). Further, the flow moves to the processing in step S15 illustrated in FIG. 4.

When it is determined in step S21 that the display ending time of the additional information is stored in storage unit 47 (Yes), additional information display control unit 46 determines whether or not the display ending time of the additional information calculated in step S20 is equal to the display ending time of the additional information stored in storage unit 47 (step S22).

When it is determined in step S22 that the display ending times are equal (Yes), the flow moves to the processing in step S15 illustrated in FIG. 4.

When it is determined in step S22 that the display ending times are not equal (No), additional information display control unit 46 compares the display ending time of the additional information calculated in step S20 and the display ending time of the additional information stored in storage unit 47. Further, additional information display control unit 46 stores an temporally earlier one of the display ending times in storage unit 47, and updates (or maintains) the display ending time of the additional information stored in storage unit 47 (step S24). Further, the flow moves to the processing in step S15 illustrated in FIG. 4.

Next, the additional information display period calculation processing will be described with reference to FIG. 6.

Figure 6:
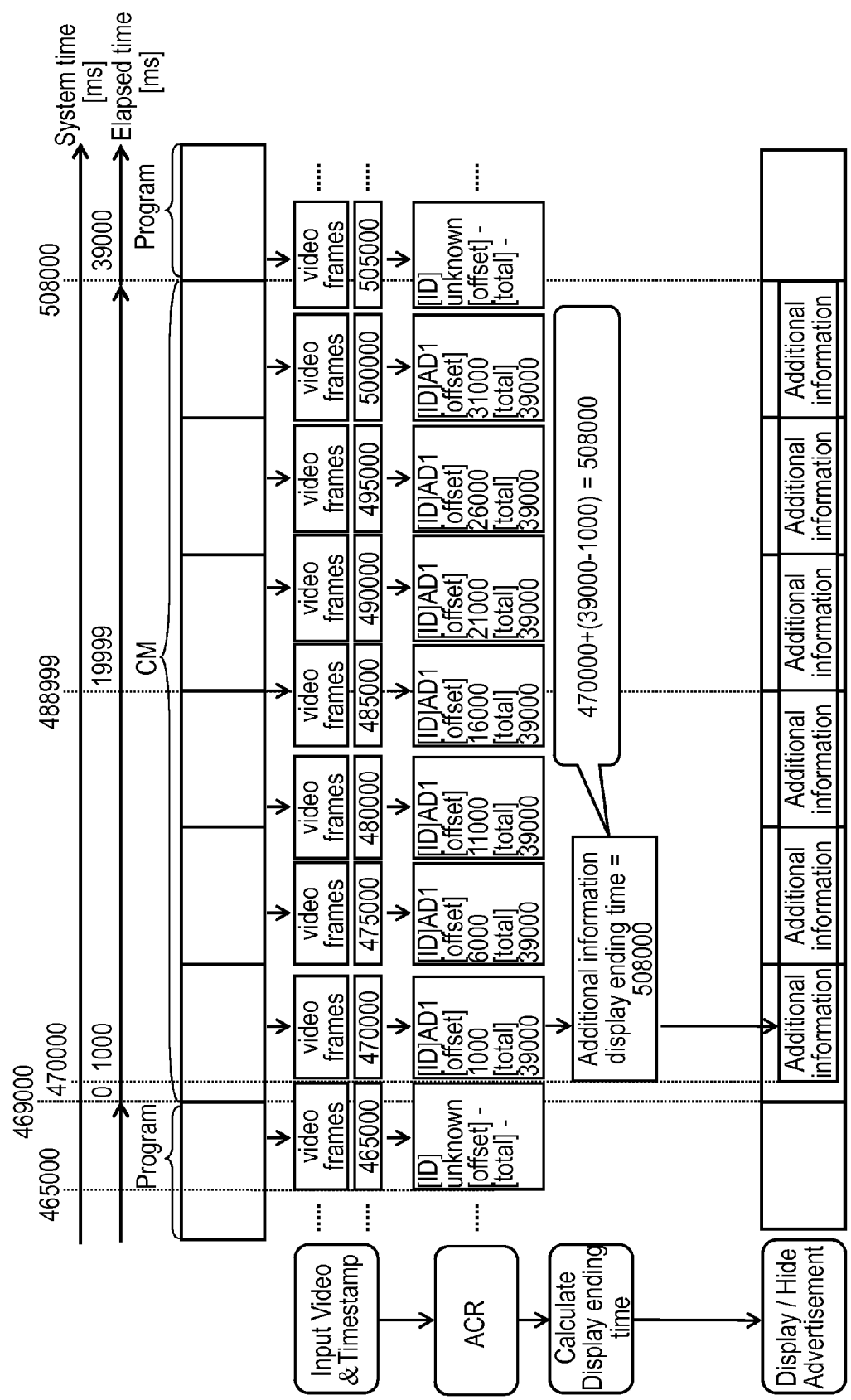
FIG. 6 is a view schematically illustrating an example of additional information display period calculation processing performed by the video reception device according to the first exemplary embodiment.

FIG. 6 is a view schematically illustrating an example of the additional information display period calculation processing performed by video reception device 40 according to the first exemplary embodiment.

FIG. 6 schematically illustrates a system time, an elapsed time, video signals (content), partial videos, display control information, a display ending time, and an image to be displayed on displaying unit 54. Further, FIG. 6 illustrates an example where content is switched from a program to a CM and from the CM to the program. Furthermore, in the example illustrated in FIG. 6, a CM is content on which additional information is superimposed. Still further, the elapsed time illustrated in FIG. 6 is a time passed from a CM start time, and the CM start time is 0 msec. In addition, the time is timed by being converted into a value based on GMT (Greenwich Mean Time) or UTC (Universal Time Coordinated).

FIG. 6 illustrates an example where this CM starts when the system time of video reception device 40 is 469000 msec and ends when the system time is 508000 msec.

For example, storage unit 23 of video recognition device 20 stores information indicating that this CM is "AD1" (indicated as an ID (Identification) of the content in FIG. 6), "a display period of additional information (a period in which advertisement information can be displayed)" related to this CM (indicated as "total" in FIG. 6) is "39000 msec". Also, storage unit 23 of video recognition device 20 stores information, too, indicating an offset time (indicated as "offset" in FIG. 6) obtained from video recognition device 20.

Video reception device 40 transmits to video recognition device 20 a partial video extracted at a predetermined cycle (indicated as "video frames" in FIG. 6), and the system time at which the partial video is extracted (time stamp information which is indicated directly below the video frames in FIG. 6) together with a video recognition request.

Video recognition device 20 performs video recognition processing on the received partial video by an ACR technique.

The above information of "AD1" is information transmitted as this video recognition processing result from video recognition device 20 to video reception device 40. Further, video reception device 40 receives the display control information of the additional information, together with the video recognition processing result, from video recognition device 20. The above information of "39000 msec" is included in this display control information as information indicating a display period of the additional information (a period in which advertisement information can be displayed).

Further, this display control information includes information indicating an offset time. The information indicating the offset time is information indicating a difference between a start time of content managed by video recognition device 20 and time stamp information (system time) obtained when the partial video is extracted. For example, in FIG. 6, the CM start time is "469000 msec", and the system time (time stamp information) at which the first partial video whose video recognition processing result of video recognition device 20 is "AD1" is extracted is "470000 msec". Hence, the offset time of this partial video is "1000 msec" obtained by subtracting 469000 msec from 470000 msec. Numerical values (whose unit is msec) such as "6000", "11000" and "16000" calculated in the same way are offset times of each partial video.

Video reception device 40 obtains additional information (advertisement information) based on the video recognition processing result (information of "AD1" in the example illustrated in FIG. 6) obtained from video recognition device 20, from additional information distribution device 30 and stores the additional information in storage unit 47.

Additional information display control unit 46 of video reception device 40 calculates the display ending time of the additional information based on the system time (time stamp information) at which the partial video is extracted, and the display control information of the additional information (the information of "39000 msec" and the information indicating the offset time in the example illustrated in FIG. 6).

An example where a display ending time of additional information is calculated based on the first partial video (also referred to as the "first partial video" below) whose video recognition processing result of video recognition device 20 is "AD1" will be described below.

In the example illustrated in FIG. 6, the system time (time stamp information) at which the first partial video is extracted is "470000 msec". Further, the display period of the additional information (a period in which advertisement information can be displayed) which video reception device 40 receives together with this video recognition processing result is "39000 msec", and the offset time is "1000 msec". Additional information display control unit 46 calculates the display ending time of the additional information based on these numerical values. More specifically, additional information display control unit 46 adds a result obtained by subtracting the offset time "1000 msec" from the display period "39000 msec" of the additional information, to the system time "470000 msec" at which the partial video is extracted. That is, additional information display control unit 46 performs the following arithmetic operation.

470000+(39000−1000)=508000

The time obtained by this arithmetic operation, that is, the time "508000 msec" in the above example is "the display ending time of the additional information" calculated in relation to the first partial video. Additional information display control unit 46 calculates the display ending time of the additional information in this way.

Additional information display control unit 46 instructs control unit 41 to superimpose the additional information on the content and display the additional information on displaying unit 54 until the system time reaches the calculated display ending time of the additional information. Control unit 41 controls video output unit 44 based on this instruction. In the above example, control unit 41 controls video output unit 44 to superimpose the additional information (the advertisement information stored in storage unit 47) on the content and display the additional information on displaying unit 54 until the system time reaches "508000 msec", and hide the additional information when the system time reaches "508000 msec".

Next, outlines of steps S22 and S24 illustrated in FIG. 5 will be described with reference to FIG. 7.

Figure 7:
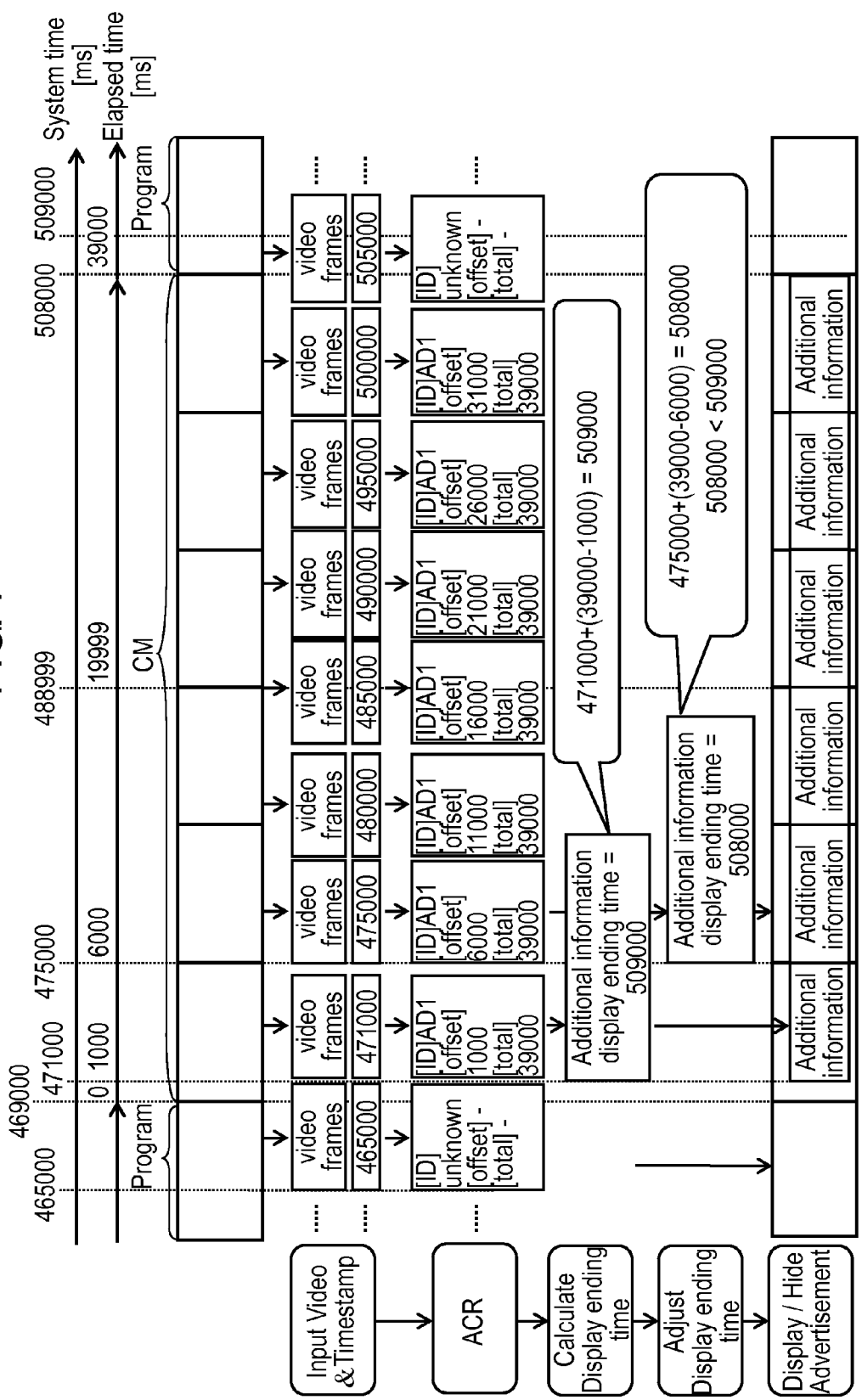
FIG. 7 is a view schematically illustrating another example of the additional information display period calculation processing performed by the video reception device according to the first exemplary embodiment.

FIG. 7 is a view schematically illustrating another example of additional information display period calculation processing performed by video reception device 40 according to the first exemplary embodiment.

FIG. 7 is based on FIG. 6 and therefore will not be described in detail.

Video reception device 40 calculates a display ending time of additional information every time video reception device 40 receives a new video recognition processing result and display control information of additional information from video recognition device 20. Further, as described as to steps S22 and S24, a newly calculated display ending time and the display ending time stored in storage unit 47 are compared, and temporally earlier one of the display ending times is stored in storage unit 47 and is replaced with the display ending time stored in storage unit 47 so far. Thus, the display ending time stored in storage unit 47 is updated.

An example where a display ending time of additional information is calculated based on the first partial video (the first partial video) whose video recognition processing result of video recognition device 20 is "AD1" and a subsequent partial video (second partial video) will be described below.

In the example illustrated in FIG. 7, the system time (time stamp information) at which the first partial video is extracted is "471000 msec". In addition, it is assumed that this system time (time stamp information) is "471000 msec" while the correct system time is "470000 msec" since some factors (e.g. blackout or temporary concentration of various types of processing in video reception device 40) causes abnormality of the system time. That is, it is assumed that a time which is delayed by "1000 msec" from the original time is generated as time stamp information.

Further, the display period of the additional information (the period in which advertisement information can be displayed) which video reception device 40 receives together with this video recognition processing result is "39000 msec", and the offset time is "1000 msec".

Additional information display control unit 46 adds a result obtained by subtracting the offset time "1000 msec" from the display period "39000 msec" of the additional information, to the system time "471000 msec" at which the partial video is extracted.

471000+(39000−1000)=509000

The time "509000 msec" obtained by this arithmetic operation is the display ending time of the additional information calculated in relation to the first partial video. However, this display ending time includes the above time offset, and therefore is a time delayed by "1000 msec" from the time "508000 msec" at which a CM actually ends. Hence, even after the content (CMs) ends and a next content (main program) starts, there is a concern that this additional information (advertisement information) is left displayed on displaying unit 54 for a period of 1000 msec.

Additional information display control unit 46 stores this "509000 msec" as the display ending time of the additional information in storage unit 47.

In the example illustrated in FIG. 7, the system time (time stamp information) at which the second partial video is extracted is "475000 msec". In this case, it is assumed that the above abnormality is corrected, and time stamp information is generated based on a correct system time. Further, the display period of the additional information (a period in which advertisement information can be displayed) which video reception device 40 receives together with this video recognition processing result is "39000 msec", and the offset time is "6000 msec". Additional information display control unit 46 performs the following arithmetic operation as described above.

475000+(39000−6000)=508000

The time "508000 msec" obtained by this arithmetic operation is the display ending time of the additional information calculated in relation to this partial video. This display ending time is a time equal to the time "508000 msec" at which a CM actually ends since the above abnormality is corrected.

Additional information display control unit 46 compares "509000 msec" stored in storage unit 47 and newly calculated "508000 msec", replaces "509000 msec" stored in storage unit 47 so far with temporally earlier "508000 msec", and stores "508000 msec" as the new display ending time of the additional information in storage unit 47.

Thus, video reception device 40 compares the display ending time of the additional information stored in storage unit 47 and a newly calculated display ending time of additional information every time, and updates the display ending time to temporally earlier one of the display ending times. Consequently, video reception device 40 can prevent occurrence of a phenomenon that, after content (e.g. CM) ends and is switched to a next content (e.g. another CM or a main program), additional information (e.g. advertisement information) related to the content which has already ended still continues being displayed on displaying unit 54.

[1-3. Effect and Others]

As described above, in the first exemplary embodiment, video reception device 40 is configured to transmit and receive data through communication network 16, and includes input unit 65, video extraction unit 45, control unit 41 and additional information display control unit 46. Input unit 65 is configured to receive an input of a video signal output from the video transmission device (e.g. STB 14) installed outside. Video extraction unit 45 is configured to extract a partial video for video recognition processing, from the video signal. Control unit 41 is configured to perform control of transmitting the partial video to video recognition device 20 connected to communication network 16 so as to request video recognition device 20 to perform the video recognition processing, obtaining the video recognition processing result and display control information of additional information from video recognition device 20, and obtaining additional information (e.g. advertisement information) based on the video recognition processing result from additional information distribution device 30 connected to communication network 16. Additional information display control unit 46 is configured to perform control of calculating a display ending time of the additional information based on a system time at which video extraction unit 45 extracts the partial video, and the display control information, and superimposing the additional information on the video signal based on the display ending time.

Consequently, video reception device 40 can prevent occurrence of a phenomenon that, after content (e.g. CM) ends and is switched to a next content (e.g. another CM or a main program), additional information (e.g. advertisement information) related to the content which has already ended still continues being displayed on displaying unit 54.

When, for example, together with content, a continuation time of the content or information such as a time at which the content is switched to a next content is notified from broadcast station 12, video reception device 40 can learn when to hide the additional information by obtaining this information.

However, when only video signals are transmitted from the video transmission device such as STB 14 through input unit 65, video reception device 40 has difficulty in learning the continuation time of the content or a time at which the content is switched to a next content. Hence, video reception device 40 according to the present exemplary embodiment calculates a display ending time of additional information by performing the above additional information display period calculation processing, and hides the additional information which is being displayed on displaying unit 54 based on the calculated display ending time. Consequently, when content on which additional information is to be superimposed ends, it is possible to hide this additional information. Consequently, it is possible to prevent occurrence of a phenomenon that additional information is erroneously superimposed on a subsequent content.

Further, video reception device 40 may include displaying unit 54 which is configured to display a video obtained by superimposing additional information 51 on video signals. Furthermore, additional information display control unit 46 may be configured to perform control of hiding the additional information which is being displayed on displaying unit 54 based on the calculated display ending time.

Still further, the display control information which control unit 41 obtains from video recognition device 20 may include information indicating a display period of the additional information, and information indicating an offset time.

Consequently, additional information display control unit 46 can calculate the display ending time of the additional information by adding a result obtained by subtracting the offset time from the display period of the additional information, to the system time at which the partial video is extracted.

Further, video reception device 40 may further include storage unit 47 which is configured to store a display ending time of additional information. Furthermore, additional information display control unit 46 may be configured to perform control of causing storage unit 47 to store the calculated display ending time of the additional information, comparing the calculated display ending time of the additional information and the display ending time of the additional information stored in storage unit 47 every time video extraction unit 45 extracts a partial video, updating the display ending time by storing temporally earlier one of the display ending times in storage unit 47, and hiding the additional information which is being displayed on displaying unit 54 at the display ending time of the additional information stored in storage unit 47.

Thus, video reception device 40 compares the display ending time of the additional information stored in storage unit 47 and a newly calculated display ending time of additional information every time, and updates the display ending time to temporally earlier one of the display ending times.

When, for example, some factors (e.g. blackout or temporary concentration of various types of processing in video reception device 40) causes an offset between a system time managed by video reception device 40 and an actual time, an offset is produced between the calculated display ending time of the additional information and an ending time of content on which the additional information is to be superimposed. In such a case, there is a concern that a phenomenon that, even though content ends and a new content is displayed on displaying unit 54, the additional information is still left displayed on displaying unit 54 occurs.

However, even when such a phenomenon occurs, the display ending time of the additional information stored in storage unit 47 is updated to a temporally earlier display ending timing. Consequently, it is possible to prevent occurrence of a phenomenon that, after content (e.g. CM) ends and is switched to a next content (e.g. another CM or a main program), additional information (e.g. advertisement information) related to the content which has already ended still continues being displayed on displaying unit 54.

Additional information display system 10 according to the present exemplary embodiment includes video reception device 40, video recognition device 20 and additional information distribution device 30 which are configured to transmit and receive data to each other through communication network 16. Video reception device 40 includes input unit 65, video extraction unit 45, control unit 41 and additional information display control unit 46. Input unit 65 is configured to receive an input of a video signal output from the video transmission device (e.g. STB 14) installed outside. Video extraction unit 45 is configured to extract a partial video for video recognition processing, from the video signal. Control unit 41 is configured to perform control of transmitting a partial video to video recognition device 20 through communication network 16 so as to request video recognition device 20 to perform the video recognition processing, obtaining a video recognition processing result and display control information of additional information from video recognition device 20 through communication network 16, and obtaining additional information (e.g. advertisement information) based on the video recognition processing result from additional information distribution device 30 through communication network 16. Additional information display control unit 46 is configured to perform control of calculating a display ending time of the additional information based on a system time at which video extraction unit 45 extracts the partial video, and the display control information, and superimposing the additional information on the video signal based on the display ending time. Video recognition device 20 is configured to receive the partial video transmitted from video reception device 40 through communication network 16, perform the video recognition processing using the partial video, and output the video recognition processing result and the display control information of the additional information to video reception device 40 through communication network 16. Additional information distribution device 30 is configured to transmit additional information corresponding to the video recognition processing result received through communication network 16, to video reception device 40 through communication network 16.

Consequently, video reception device 40 can prevent occurrence of a phenomenon that, after content (e.g. CM) ends and is switched to a next content (e.g. another CM or a main program), additional information (e.g. advertisement information) related to the content which has already ended still continues being displayed on displaying unit 54.

Second Exemplary Embodiment

The second exemplary embodiment will be described below with reference to FIG. 8.

An example where video reception device 40 is configured to calculate a display ending time of additional information, and hide the additional information which is being displayed on displaying unit 54 based on the calculated display ending time and a system has been described in the first exemplary embodiment. However, the present disclosure is by no means limited to this configuration. For example, the video reception device may be configured to calculate "a remaining time of additional information" instead of a display ending time of the additional information based on a system time at which a partial video is extracted and display control information of the additional information obtained from video recognition device 20, and hide the additional information which is being displayed on displaying unit 54 based on the calculated display remaining time of the additional information.

In addition, "the display remaining time of the additional information" refers to a time (display remaining time) from a current system time to a time at which displaying the additional information ends.

[2-1. Configuration]

Figure 8:
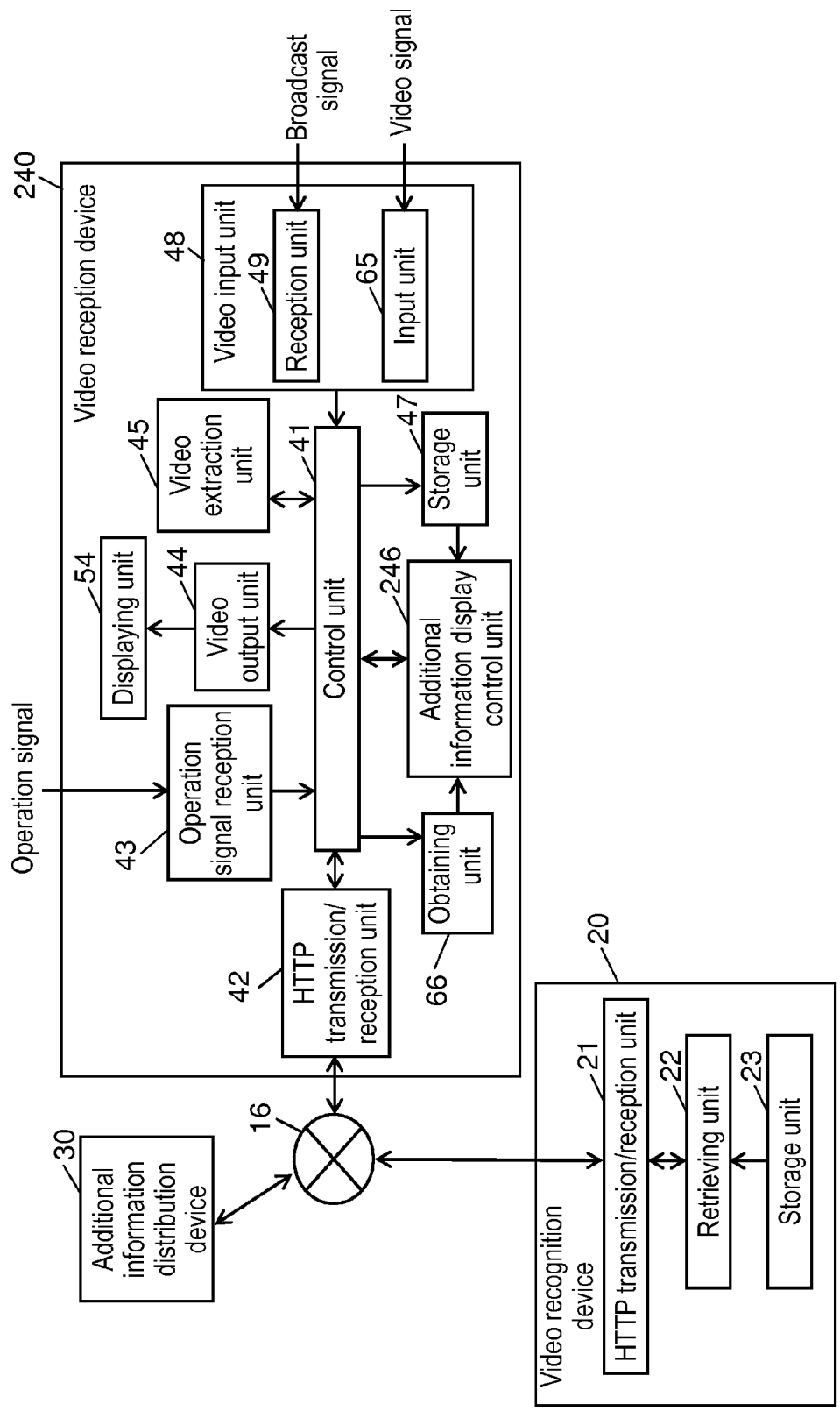
FIG. 8 is a block diagram schematically illustrating an example of configurations of a video recognition device and a video reception device according to a second exemplary embodiment.

FIG. 8 is a block diagram schematically illustrating an example of configurations of video recognition device 20 and video reception device 240 according to the second exemplary embodiment.

In addition, video reception device 240 according to the second exemplary embodiment employs the substantially same configuration as that of video reception device 40 illustrated in FIG. 2 in the first exemplary embodiment. Further, each circuit block performs the substantially same operations as those in the first exemplary embodiment. In this regard, the second exemplary embodiment differs from additional information display control unit 46 described in the first exemplary embodiment in an operation of additional information display control unit 246. Differences from the first exemplary embodiment will be described below, and the substantially same operations as those in the first exemplary embodiments will not be described.

[2-2. Operation]

Additional information display control unit 246 of video reception device 240 calculates as a first time a time obtained by subtracting an offset time from a display period of additional information (a period in which advertisement information can be displayed), and calculates as a second time a time obtained by subtracting a system time at which a partial video is extracted, from a current system time. Further, a time calculated by subtracting the second time from the first time refers to "a display remaining time of additional information". Additional information display control unit 246 instructs control unit 41 to hide the additional information (advertisement information) which is being displayed on displaying unit 54, at a point of time at which "the display remaining time of the additional information" passes from the current system time, i.e., at a point of time at which the system time reaches a time obtained by adding "the display remaining time of the additional information" to the current system time.

An example where additional information display control unit 246 calculates a display remaining time of additional information based on a first partial video whose video recognition processing result of video recognition device 20 is "AD1" will be described with reference to FIG. 6 used in the first exemplary embodiment.

When, for example, the display period of the additional information is "39000 msec" and an offset time is "1000 msec", the first time is "38000 msec". Further, when the current system time is "471000 msec" and the system time at which the partial video is extracted is "470000 msec", the second time is "1000 msec". Hence, "37000 msec" obtained by subtracting "1000 msec" from "38000 msec" is the remaining time of the additional information in this example when the system time is "471000 msec". In this case, additional information display control unit 246 instructs control unit 41 to hide the additional information (advertisement information) which is being displayed on displaying unit 54, at a point of time at which "37000 msec" passes from the current system time "471000 msec", i.e., at a point of time at which the system time reaches "508000 msec". According to this instruction, control unit 41 controls video output unit 44 to hide the additional information which is being displayed on displaying unit 54.

In addition, video reception device 240 may be configured to perform operations described as to steps S22 and S24. That is, additional information display control unit 246 stores the calculated display remaining time of the additional information in storage unit 47, calculates a display remaining time of additional information every time a partial video is extracted, compares the calculated display remaining time of the additional information and the display remaining time of the additional information stored in storage unit 47, and updates the display remaining time of the additional information by storing in storage unit 47 the display remaining time of an earlier display ending time of the additional information. For example, video reception device 240 may be configured to perform such an operation.

In addition, additional information display control unit 246 may instruct control unit 41 to hide additional information which is being displayed on displaying unit 54, at a timing at which the calculated "display remaining time of the additional information" becomes 0.

In addition, video reception device 240 may be configured to display the calculated "display remaining time of the additional information" together with the additional information on displaying unit 54.

[2-3. Effect and Others]

As described above, in video reception device 240 according to the second exemplary embodiment, additional information display control unit 246 is configured to calculate instead of a display ending time of the additional information a display remaining time until displaying additional information ends, based on a system time at which video extraction unit 45 extracts a partial video, and display control information.

Consequently, video reception device 240 can prevent occurrence of a phenomenon that, after content (e.g. CM) ends and is switched to a next content (e.g. another CM or a main program), additional information (e.g. advertisement information) related to the content which has already ended still continues being displayed on displaying unit 54.

Third Exemplary Embodiment

The third exemplary embodiment will be described below with reference to FIGS. 9 and 10.

An example where video reception device 40 is configured to transmit one time stamp information (a system time upon start of extraction of a partial video) together with a partial video to video recognition device 20 has been described in the first exemplary embodiment. However, the present disclosure is by no means limited to this configuration. For example, the video reception device may be configured to transmit a plurality of pieces of time stamp information together with a partial video to video recognition device 20.

[3-1. Configuration]

Figure 9:
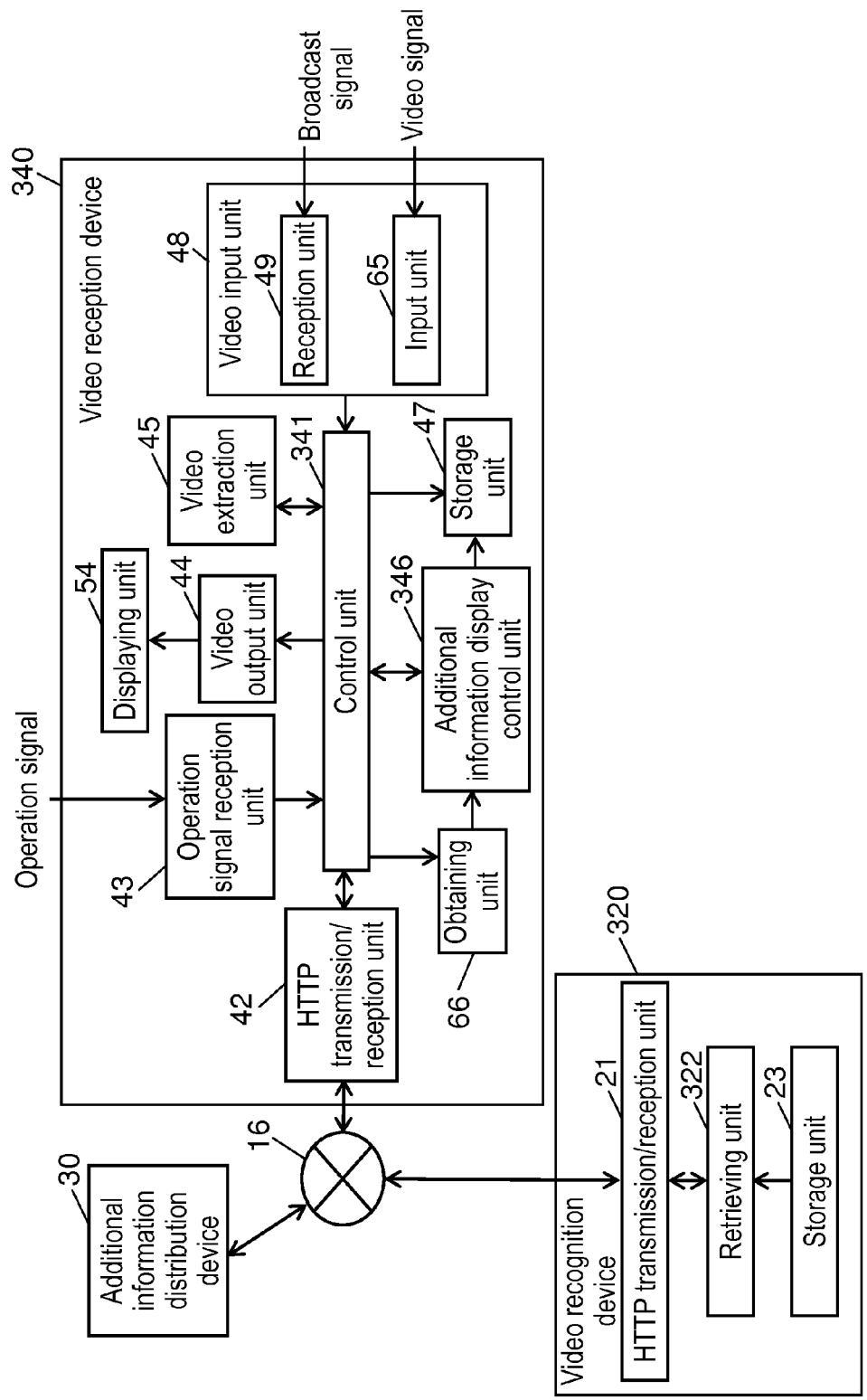
FIG. 9 is a block diagram schematically illustrating an example of configurations of a video recognition device and a video reception device according to a third exemplary embodiment.

FIG. 9 is a block diagram schematically illustrating an example of configurations of video recognition device 320 and video reception device 340 according to the third exemplary embodiment.

In addition, video reception device 340 according to the third exemplary embodiment employs the substantially same configuration as that of video reception device 40 illustrated in FIG. 2 in the first exemplary embodiment. Further, each circuit block performs the substantially same operations as those in the first exemplary embodiment. Video recognition device 320 employs the substantially same configuration as that of video recognition device 20 illustrated in FIG. 2 in the first exemplary embodiment. Further, each circuit block performs the substantially same operations as those in the first exemplary embodiment. Meanwhile, the third exemplary embodiment differs from control unit 41, additional information display control unit 46 and retrieving unit 22 described in the first exemplary embodiment in operations of control unit 341 and additional information display control unit 346 of video reception device 340 and an operation of retrieving unit 322 of video recognition device 320. Differences from the first exemplary embodiment will be described below, and the substantially same operations as those in the first exemplary embodiments will not be described.

[3-2. Operation]

An example where video reception device 340 transmits three pieces of time stamp information related to one partial video, to video recognition device 320 will be described in the third exemplary embodiment.

Figure 10:
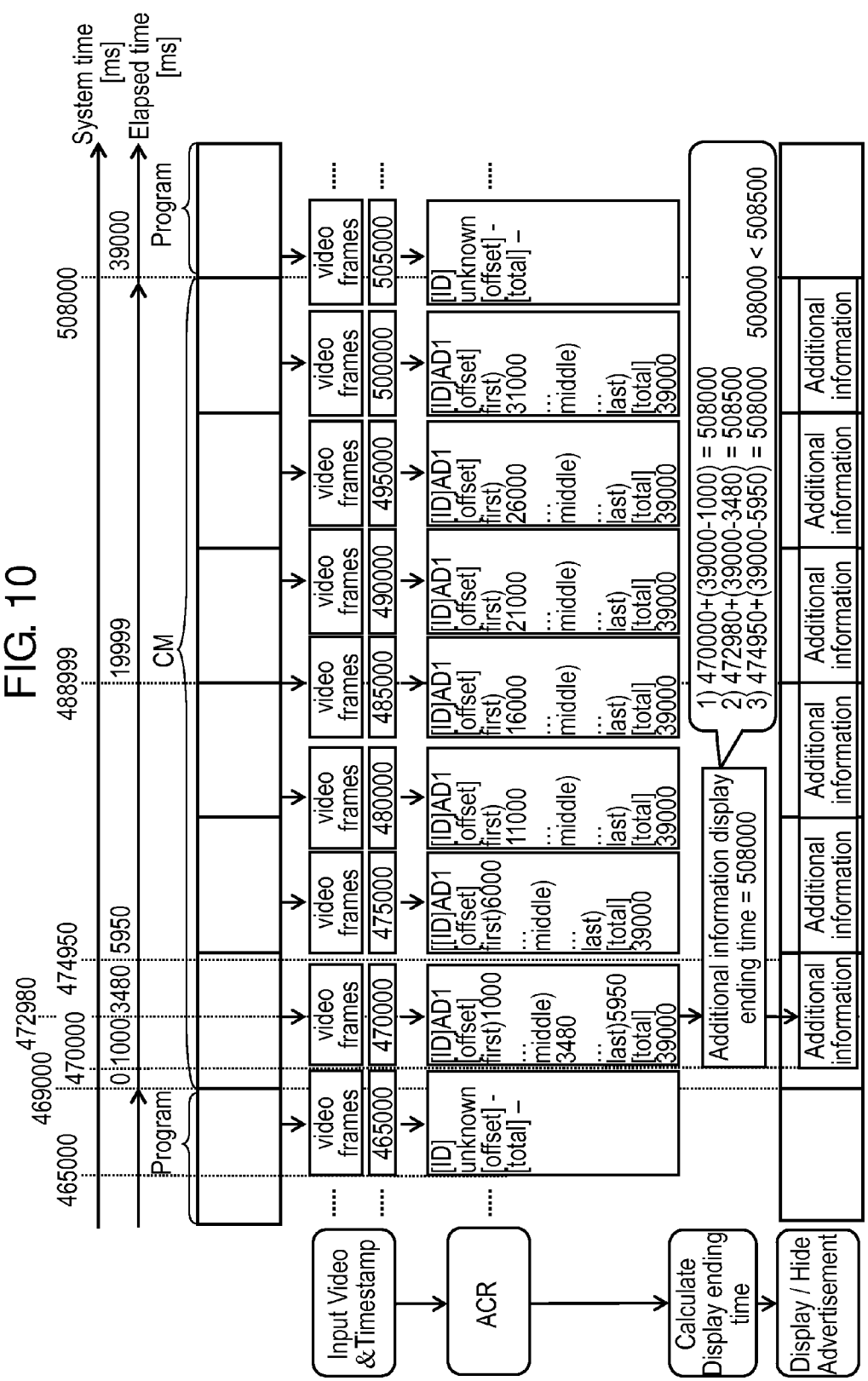
FIG. 10 is a view schematically illustrating an example of additional information display period calculation processing performed by the video reception device according to the third exemplary embodiment.

FIG. 10 is a view schematically illustrating an example of additional information display period calculation processing performed by video reception device 340 according to the third exemplary embodiment.

FIG. 10 is based on FIG. 6 and therefore will not be described in detail.

In an example illustrated in FIG. 10, control unit 341 of video reception device 340 is configured to transmit three pieces of time stamp information related to one partial video, to video recognition device 320. These three pieces of time stamp information are, for example, 1) a system time upon start of extraction of a partial video, 2) a system time during which the partial video is being obtained (a temporally central system time of the partial video) and 3) a system time upon end of extraction of the partial video. In addition, FIG. 10 illustrates only the system time upon start of extraction of a partial video as time stamp information.

Further, in the example illustrated in FIG. 10, retrieving unit 322 of video recognition device 320 returns information of three offset times corresponding to these three pieces of time stamp information, to video reception device 340. These three offset times are, for example, 1) the offset time (indicated as "first" in FIG. 10) corresponding to the system time upon start of extraction of the partial video, 2) the offset time (indicated as "middle" in FIG. 10) corresponding to the system time during which the partial video is being obtained, and 3) the offset time (indicated as "last" in FIG. 10) corresponding to the system time upon end of extraction of the partial video.

In the example illustrated in FIG. 10, three pieces of time stamp information (system times) at which the first partial video whose video recognition processing result of video recognition device 320 is "AD1" is extracted are "470000 msec", "472980 msec" and "474950 msec". Further, the display period of the additional information (a period in which advertisement information can be displayed) which video reception device 340 receives together with this video recognition processing result is "39000 msec", and the three offset times are "1000 msec", "3480 msec" and "5950 msec".

Additional information display control unit 346 of video reception device 340 performs the same arithmetic operation as an arithmetic operation of calculating "a display ending time of additional information" described in the first exemplary embodiment based on these three system times and offset times, and calculates three "display ending times of additional information". In the above example of numerical values, the following three display ending times are obtained by this arithmetic operation.

470000+(39000−1000)=508000

472980+(39000−3480)=508500

474950+(39000−5950)=508000

Additional information display control unit 346 selects the temporally earliest display ending time ("508000 msec" in the above example) of these three display ending times, and stores the selected result as the "display ending time of the additional information" related to this partial video, in storage unit 47.

Additional information display control unit 346 instructs control unit 341 to hide additional information (e.g. advertisement information) which is being displayed on displaying unit 54, at a point of time at which the system time reaches "the display ending time of the additional information" calculated in this way. According to this instruction, control unit 341 controls video output unit 44 to hide the additional information which is being displayed on displaying unit 54.

For example, video reception device 340 may be configured to perform such an operation.

In addition, video reception device 340 may be configured such that additional information display control unit 346 performs the operations described in steps S22 and S24 to update to an temporally earlier display ending time a display ending time of additional information to be stored in storage unit 47.

[3-3. Effect and Others]

As described above, in video reception device 340 according the third exemplary embodiment, control unit 341 is configured to perform control of transmitting a plurality of pieces of time stamp information together with a partial video when transmitting the partial video to video recognition device 320 connected to communication network 16. Further, video recognition device 320 is configured to return a plurality of pieces of offset information based on a plurality of pieces of time stamp information, to video reception device 340.

Consequently, video reception device 340 can more precisely prevent occurrence of a phenomenon that, after content (e.g. CM) ends and is switched to a next content (e.g. another CM or a main program), additional information (e.g. advertisement information) related to the content which has already ended still continues being displayed on displaying unit 54.

Fourth Exemplary Embodiment

The fourth exemplary embodiment will be described below with reference to FIGS. 11 and 12.

An example where video reception device 40 superimposes one additional information (e.g. advertisement information) on one content (e.g. CM) and displays the additional information on displaying unit 54 has been described in the first exemplary embodiment. However, the present disclosure is by no means limited to this configuration. For example, the video reception device may be configured to superimpose a plurality of pieces of additional information on one content (a display period of one additional information) by switching between a plurality of pieces of additional information and display a plurality of pieces of additional information on displaying unit 54.

[4-1. Configuration]

Figure 11:
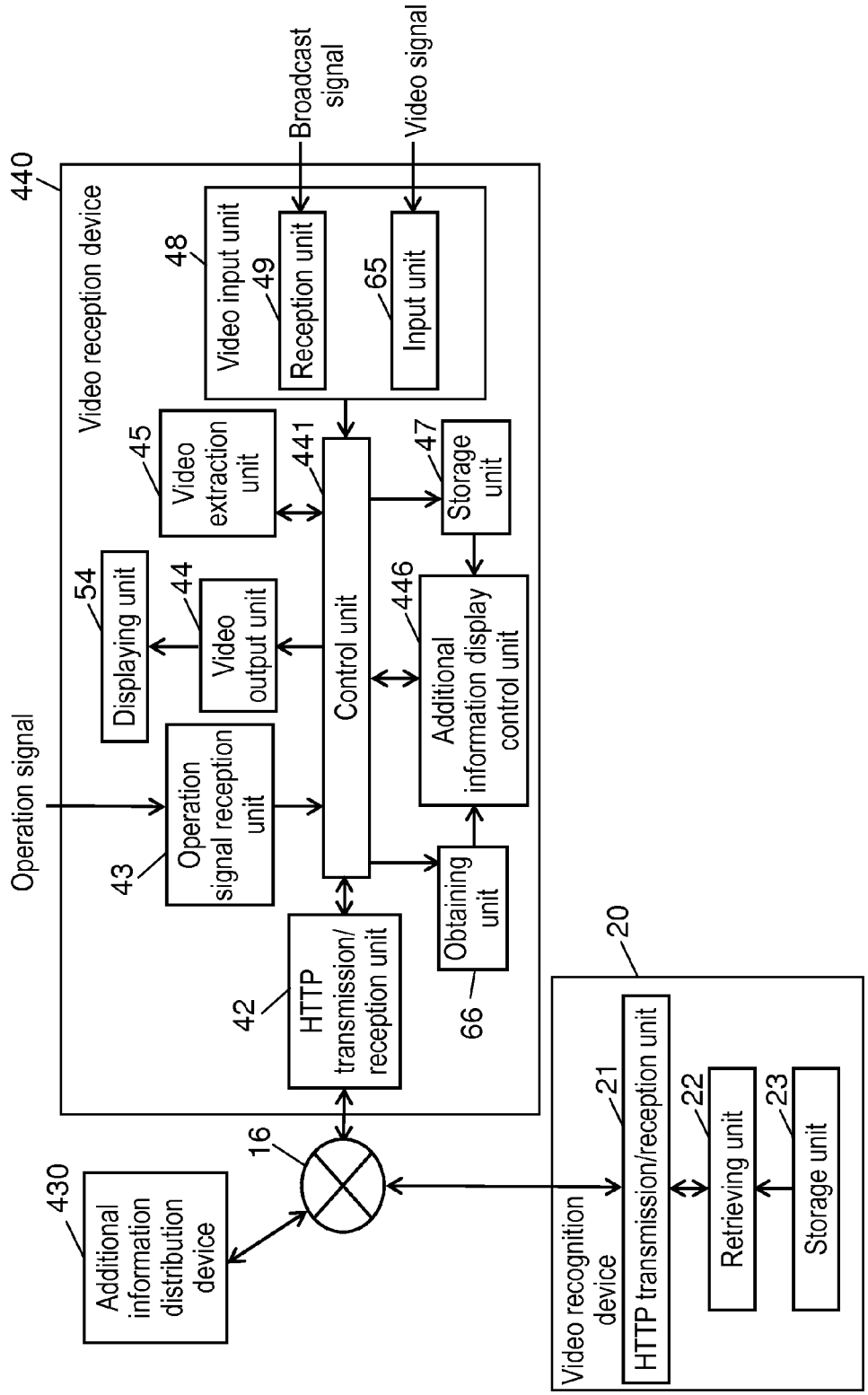
FIG. 11 is a block diagram schematically illustrating an example of configurations of a video recognition device and a video reception device according to a fourth exemplary embodiment.

FIG. 11 is a block diagram schematically illustrating an example of configurations of video recognition device 20 and video reception device 440 according to the fourth exemplary embodiment.

In addition, video reception device 440 according to the fourth exemplary embodiment employs the substantially same configuration as that of video reception device 40 illustrated in FIG. 2 in the first exemplary embodiment. Further, each circuit block performs the substantially same operations as those in the first exemplary embodiment. Meanwhile, the fourth exemplary embodiment differs from control unit 41 and additional information display control unit 46 described in the first exemplary embodiment in operations of control unit 441 and additional information display control unit 446 of video reception device 440. Further, the fourth exemplary embodiment differs from additional information distribution device 30 described in the first exemplary embodiment in an operation of additional information distribution device 430. Differences from the first exemplary embodiment will be described below, and the substantially same operations as those in the first exemplary embodiments will not be described.

[4-2. Operation]

In the fourth exemplary embodiment, additional information distribution device 430 provides a plurality of pieces of additional information related to one content, to video reception device 440. Further, video reception device 440 obtains a plurality of pieces of additional information. Furthermore, additional information distribution device 430 provides display time range information (indicated as "Display time" in FIG. 12) corresponding to each of a plurality of pieces of additional information, to video reception device 440. Still further, video reception device 440 obtains the display time range information corresponding to each of a plurality of pieces of additional information. The display time range information refers to information indicating a display period related to each of a plurality of pieces of additional information.

An example where video reception device 440 performs an operation of obtaining two pieces of additional information (first additional information and second additional information) related to one content (a display period of one additional information) from additional information distribution device 430, switching between these two pieces of additional information in order of the first additional information and the second additional information and displaying the two pieces of additional information on displaying unit 54, will be described below.

Figure 12:
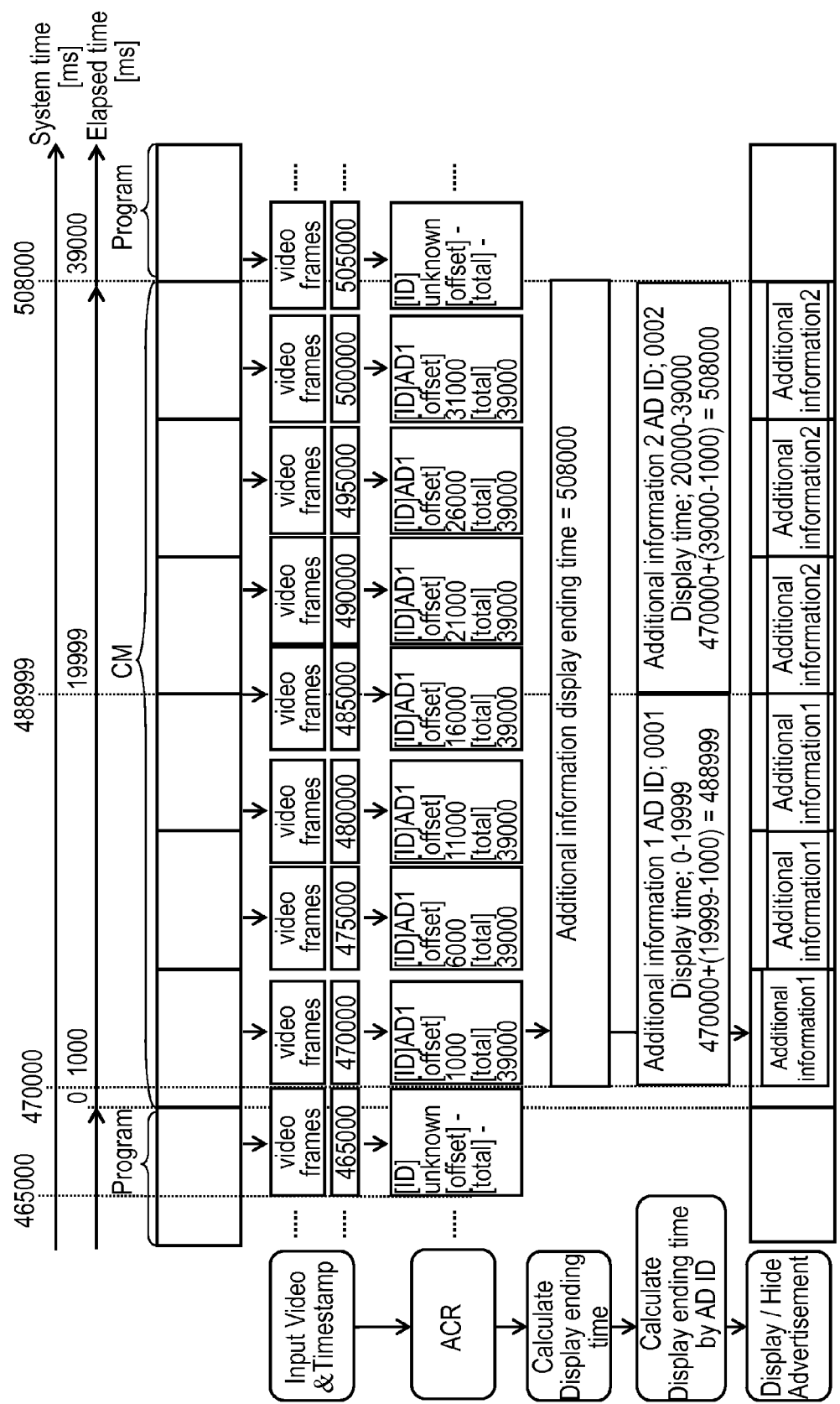
FIG. 12 is a view schematically illustrating another example of additional information display period calculation processing performed by the video reception device according to the fourth exemplary embodiment.

FIG. 12 is a view schematically illustrating another example of additional information display period calculation processing performed by video reception device 440 according to the fourth exemplary embodiment.

FIG. 12 is based on FIG. 6 and therefore will not be described in detail. In addition, FIG. 12 illustrates the first additional information as "additional information 1" and the second additional information as "additional information 2".

As illustrated in FIG. 12, control unit 441 of video reception device 440 controls each circuit block to obtain the first additional information and the second additional information, and, in addition, the display time range information of the first additional information and the display time range information of the second additional information from additional information distribution device 430.

An example where video reception device 440 calculates display ending times of the first additional information and the second additional information based on the first partial video whose video recognition processing result of video recognition device 20 is "AD1" will be described below.

In the example illustrated in FIG. 12, a system time (time stamp information) at which the first partial video whose video recognition processing result of video recognition device 20 is "AD1" is extracted is "470000 msec". Further, an offset time received together with a video recognition processing result by video reception device 440 is "1000 msec".

Furthermore, the display time range information of the first additional information and the display time range information of the second additional information obtained from additional information distribution device 430 by video reception device 440 are "0 msec to 19999 msec" and "20000 msec to 39000 msec".

Video reception device 440 calculates the display ending time of the first additional information and the display ending time of the second additional information based on these numerical values.

In the first exemplary embodiment, video reception device 40 can calculate a display ending time of additional information by adding a result obtained by subtracting the offset time from the display period of the additional information, to the system time at which a partial video is extracted. Video reception device 440 according to the fourth exemplary embodiment uses the display time range information instead of the display period of the additional information. That is, video reception device 440 is configured to calculate a display ending time of additional information by adding a result obtained by subtracting the offset time from the display time range information, to the system time at which a partial video is extracted.

More specifically, additional information display control unit 446 of video reception device 440 adds a result obtained by subtracting the offset time "1000 msec" from a maximum value "19999 msec" of the display time range information of the first additional information, to the system time "470000 msec" at which the partial video is extracted.

$$47000+(19999-1000)=488999$$

The display ending time "488999 msec" of the first additional information is obtained by this arithmetic operation.

Further, additional information display control unit 446 adds a result obtained by subtracting the offset time "1000 msec" from a maximum value "39000 msec" of the display time range information of the second additional information, to the system time "470000 msec" at which the partial video is extracted.

$$47000+(39000-1000)=508000$$

The display ending time "508000 msec" of the second additional information is obtained by this arithmetic operation.

Additional information display control unit 446 instructs control unit 441 to superimpose the first additional information on content (e.g. CM) and display the first additional information on displaying unit 54 until the system time reaches 488999 msec, superimpose the second additional information instead of the first additional information on the content and display the second additional information on displaying unit 54 until the system time reaches 508000 msec after reaching 488999 msec, and hide the second additional information after the system time reaches 508000 msec. According to this instruction, control unit 441 controls video output unit 44 to display the first additional information and the second additional information in order on displaying unit 54, and hide the second additional information when the system time reaches 508000 msec.

In addition, video reception device 440 may simultaneously display a plurality of pieces of additional information on displaying unit 54.

[4-3. Effect and Others]

As described above, in video reception device 440 according to the fourth exemplary embodiment, control unit 441 is configured to perform control of obtaining a plurality of pieces of additional information including display time range information based on a video recognition processing result, from additional information distribution device 430. Further, additional information display control unit 446 is configured to switch between a plurality of pieces of additional information according to the display time range information and display a plurality of pieces of additional information on a displaying unit.

Consequently, video reception device 440 can prevent occurrence of a phenomenon that, when a plurality of pieces of additional information (e.g. a plurality of pieces of additional information) is switched and is displayed on displaying unit 54, after content (e.g. CM) ends and is switched to a next content (e.g. another CM or a main program), additional information (e.g. advertisement information) related to the content which has already ended still continues being displayed on displaying unit 54.

Fifth Exemplary Embodiment

The fifth exemplary embodiment will be described below with reference to FIG. 13.

An example where video reception device 40 is configured to calculate a display ending time of additional information has been described in the first exemplary embodiment. However, the present disclosure is by no means limited to this configuration. For example, the additional information display system may be configured to transmit a display ending time of additional information from the video recognition device to the video reception device.

[5-1. Configuration]

Figure 13:
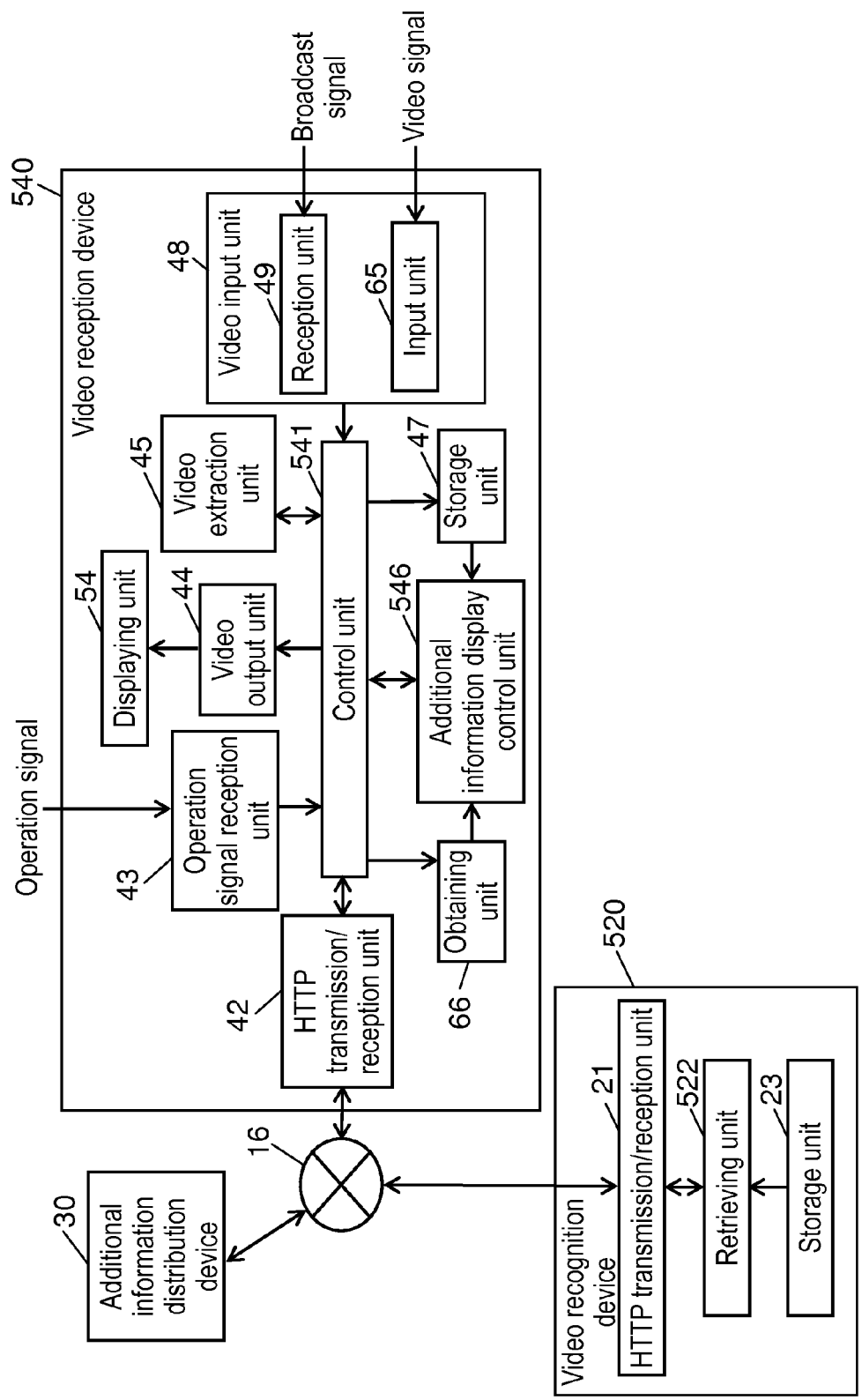
FIG. 13 is a block diagram schematically illustrating an example of configurations of a video recognition device and a video reception device according to a fifth exemplary embodiment.

FIG. 13 is a block diagram schematically illustrating an example of configurations of video recognition device 520 and video reception device 540 according to the fifth exemplary embodiment.

In addition, video reception device 540 according to the fifth exemplary embodiment employs the substantially same configuration as that of video reception device 40 illustrated in FIG. 2 in the first exemplary embodiment. Further, each circuit block performs the substantially same operations as those in the first exemplary embodiment. Video recognition device 520 employs the substantially same configuration as that of video recognition device 20 illustrated in FIG. 2 in the first exemplary embodiment. Further, each circuit block performs the substantially same operations as those in the first exemplary embodiment. Meanwhile, the fifth exemplary embodiment differs from control unit 41, additional information display control unit 46 and retrieving unit 22 described in the first exemplary embodiment in operations of control unit 541 and additional information display control unit 546 of video reception device 540 and an operation of retrieving unit 522 of video recognition device 520. Differences from the first exemplary embodiment will be described below, and the substantially same operations as those in the first exemplary embodiments will not be described.

[5-2. Operation]

The fifth exemplary embodiment is the same as the first exemplary embodiment in that video reception device 540 transmits a video recognition request including a partial video extracted by video extraction unit 45 and a system time (time stamp information) at which the partial video is extracted, to video recognition device 520.

Meanwhile, retrieving unit 522 of video recognition device 520 differs from retrieving unit 22 of video recognition device 20 described in the first exemplary embodiment in being configured to, when receiving a video recognition request including a partial video and time stamp information transmitted from video reception device 540, perform video recognition processing using this partial video, execute the substantially same processing as additional information display period calculation processing described in the first exemplary embodiment based on display control information of additional information based on this video recognition processing result and the time stamp information included in the video recognition request, and calculate a display ending time of the additional information.

Video recognition device 520 transmits information indicating the calculated display ending time together with the video recognition processing result to video reception device 540.

Further, control unit 541 of video reception device 540 controls each circuit block to obtain the video recognition processing result and the information indicating the display ending time of the additional information from video recognition device 520. Hence, additional information display control unit 546 described in the fifth exemplary embodiment does not perform the additional information display period calculation processing described in the first exemplary embodiment.

Additional information display control unit 546 instructs control unit 541 to hide additional information which is being displayed on displaying unit 54, at a point of time at which the system time reaches the display ending time of the additional information obtained from video recognition device 520. According to this instruction, control unit 541 controls video output unit 44 to hide the additional information which is being displayed on displaying unit 54.

In addition, retrieving unit 522 of video recognition device 520 may be configured to calculate a display remaining time of additional information described in the second exemplary embodiment based on the display control information of the additional information and the time stamp information included in the video recognition request. In this case, additional information display control unit 546 instructs control unit 541 to hide additional information which is being displayed on displaying unit 54, based on the display remaining time of the additional information obtained from video recognition device 520.

[5-3. Effect and Others]

As described above, in the fifth exemplary embodiment, video reception device 540 is configured to transmit and receive data through communication network 16, and includes input unit 65, video extraction unit 45, control unit 541 and additional information display control unit 546. Input unit 65 is configured to receive an input of a video signal output from the video transmission device (e.g. STB 14) installed outside. Video extraction unit 45 is configured to extract a partial video for video recognition processing, from the video signal. Control unit 541 is configured to perform the following control. Control unit 541 performs control of transmitting a partial video to video recognition device 520 connected to communication network 16 so as to request video recognition device 520 to perform video recognition processing, and transmitting a system time at which video extraction unit 45 extracts a partial video. Control unit 541 performs control of obtaining the video recognition processing result, and the display ending time of the additional information or the display remaining time of the additional information from video recognition device 520. Further, control unit 541 performs control of obtaining additional information (e.g. advertisement information) based on the video recognition processing result, from additional information distribution device 30 connected to communication network 16. Additional information display control unit 546 is configured to perform control of superimposing the additional information on video signals based on the display ending time or the display remaining time obtained from video recognition device 520.

Consequently, video reception device 540 can prevent occurrence of a phenomenon that, after content (e.g. CM) ends and is switched to a next content (e.g. another CM or a main program), additional information (e.g. advertisement information) related to the content which has already ended still continues being displayed on displaying unit 54.

The additional information display system according to the present exemplary embodiment includes video reception device 540, video recognition device 520 and additional information distribution device 30 which are configured to transmit and receive data to each other through communication network 16. Video recognition device 520 is configured to receive the partial video transmitted from video reception device 40 through communication network 16, and the system time at which video extraction unit 45 extracts the partial video, perform the video recognition processing using the partial video, output the video recognition processing result to video reception device 540 through communication network 16, and transmit the display ending time of the additional information or the display remaining time of the additional information based on the system time, to video reception device 540 through communication network 16. Additional information distribution device 30 is configured to transmit the additional information corresponding to the video recognition processing result received through communication network 16, to video reception device 540 through communication network 16.

Consequently, video reception device 540 can prevent occurrence of a phenomenon that, after content (e.g. CM) ends and is switched to a next content (e.g. another CM or a main program), additional information (e.g. advertisement information) related to the content which has already ended still continues being displayed on displaying unit 54.

Other Exemplary Embodiment

As described above, the first to fifth exemplary embodiments have been described as an exemplary technique disclosed in the present application. However, the technique according to the present disclosure is not limited to this, and is also applicable to exemplary embodiments which are optionally changed, replaced, added and omitted. Further, each component described in the first to fifth exemplary embodiments can also be combined to provide new exemplary embodiments.

Another exemplary embodiment will be described below.

A configuration where a video reception device includes displaying unit 54 has been described in the first to fifth exemplary embodiments. However, the video reception device according to the present disclosure is by no means limited to this configuration. The video reception device may not include a displaying unit.

Figure 14:
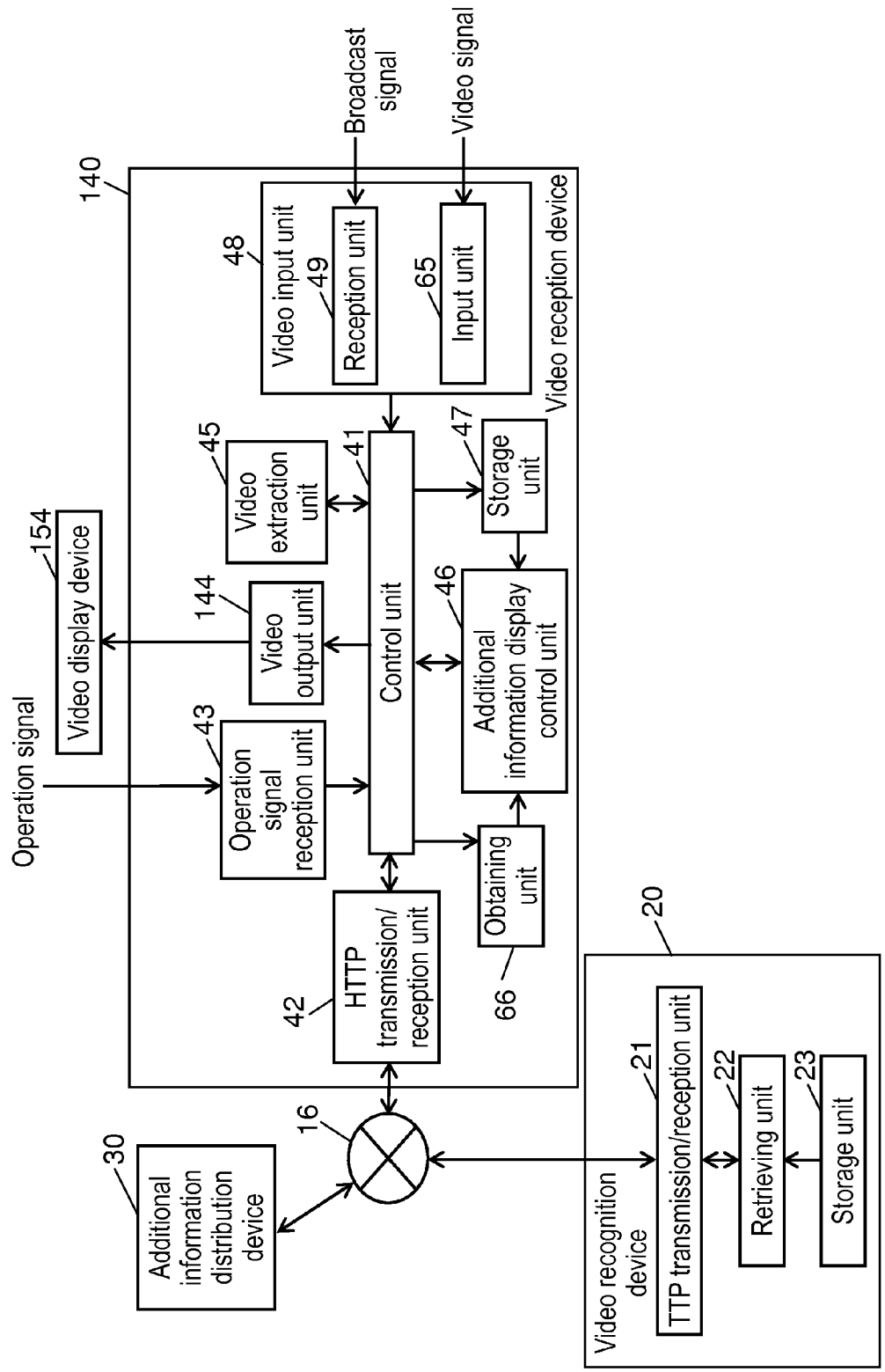
FIG. 14 is a block diagram schematically illustrating an example of a configuration of a video reception device according to another exemplary embodiment.

FIG. 14 is a block diagram schematically illustrating an example of a configuration of video reception device 140 according to another exemplary embodiment. Video reception device 140 illustrated in FIG. 14 differs from the video reception devices described in the first to fifth exemplary embodiments in the following points. Video reception device 140 does not include displaying unit 54, and video output unit 144 is configured to output video signals to video display device 154 installed outside through wires or by radio.

Video reception device 140 of this type is, for example, a recording device which has, for example, a recording function, a broadcast signal receiving function, a video signal input function and a video signal output function, and which is configured to transmit video signals to video display device 154 installed outside. Such a recording device is, for example, a hard disk recorder, a DVD recorder, a BD recorder or the like.

In addition, FIG. 14 illustrates each component based on video reception device 40 illustrated in FIG. 2. However, the same configuration as that in FIG. 14 is applicable to each video reception device described in the second to fifth exemplary embodiments.

In addition, an operation of each circuit block is the substantially same as that of each video reception device described in the first to fifth exemplary embodiments except that video reception device 140 illustrated in FIG. 14 includes video display device 154 installed outside, and therefore will not be described. Further, FIG. 14 illustrates a main circuit block related to an operation described in the exemplary embodiment, and does not illustrate functions and circuit blocks related to other operations (e.g. a recording function).

Video reception device 140 employing such a configuration can provide the same effects as those of the video reception devices described in the first to fifth exemplary embodiments.

In addition, a configuration where the video reception device transmits a partial video to the video recognition device so as to request the video recognition device to perform content specifying processing has been described in the first to fifth exemplary embodiments. However, the present disclosure is by no means limited to this configuration. For example, the video reception device may be configured to generate a fingerprint (e.g. a hash value of each image which configures a partial image) from a partial image, transmit this fingerprint to the video recognition device so as to request the video recognition device to perform video recognition processing. In this case, the video recognition device performs an operation of receiving this fingerprint, cross-checking this fingerprint and the fingerprint generated in advance by the video recognition device and stored in the storage unit, and retrieving content corresponding to the received fingerprint.

In addition, each component described in the first to fifth exemplary embodiments may be configured as an independent circuit. Alternatively, each circuit block may be configured such that a program created to realize one or a plurality of circuit blocks is executed by a processor. Further, this program may be obtained by being downloaded from a server or the like or may be obtained through a predetermined recording medium (e.g. an optical disk such as a CD-ROM, a magnetic disk or a semiconductor memory).

Furthermore, each operation of the server described in the first to fifth exemplary embodiments may be collectively processed by a single server or may be distributed to and processed by a plurality of servers.

In addition, specific numerical values described in the first to fifth exemplary embodiments are only exemplary numerical values in the exemplary embodiments, and the present disclosure is by no means limited to these numerical values. Each numerical value is desirably set to an optimal value according to a specification of a video reception device or the like.

INDUSTRIAL APPLICABILITY

The present disclosure is applicable to a video reception device which can obtain additional information related to video signals input from a video transmission device installed outside, and superimpose the obtained additional information on the video signals. More specifically, the present disclosure is applicable to a television receiver, a hard disk recorder, a DVD recorder, a BD recorder and the like.

REFERENCE MARKS IN THE DRAWINGS 10 additional information display system
12 broadcast station
14 STB
16 communication network
20, 320, 520 video recognition device
21, 42 HTTP transmission/reception unit
22, 322, 522 retrieving unit
23, 47 storage unit
30, 430 additional information distribution device
40, 140, 240, 340, 440, 540 video reception device
41, 341, 441, 541 control unit
43 operation signal reception unit
44, 144 video output unit
45 video extraction unit
46, 246, 346, 446, 546 additional information display control unit
48 video input unit
49 reception unit
50 video
51 additional information
54 displaying unit
65 input unit
66 obtaining unit
154 video display device

The invention claimed is:

1. A video reception device configured to transmit and receive data through a communication network, the video reception device comprising:
   an input unit configured to receive an input of a video signal;
   a video extraction unit configured to extract a partial video for video recognition processing, from the video signal;
   a control unit configured to perform control of transmitting the partial video to a video recognition device connected to the communication network so as to request the video recognition device to perform the video recognition processing, obtaining a result of the video recognition processing and display control information of additional information from the video recognition device, and obtaining additional information based on the result of the video recognition processing from an additional information distribution device connected to the communication network;
   an additional information display control unit configured to perform control of calculating a display ending time or a display remaining time of the additional information based on a system time at which the video extraction unit extracts the partial video, and the display control information, and superimposing the additional information on the video signal based on the display ending time or the display remaining time;
   a displaying unit configured to display a video obtained by superimposing the additional information on the video signal,
   wherein the additional information display control unit is configured to perform control of hiding the additional information which is being displayed on the displaying unit, based on the display ending time or the display remaining time; and
   a storage unit configured to store the display ending time or the display remaining time;
   wherein the additional information display control unit is configured to perform control of causing the storage unit to store the calculated display ending time or display remaining time, comparing the calculated display ending time or display remaining time and the display ending time or display remaining time stored in the storage unit every time the video extraction unit extracts the partial video, updating the display ending time or the display remaining time by storing temporally earlier one of the display ending times or the display remaining times in the storage unit, and hiding the additional information which is being displayed on the displaying unit at the display ending time or the display remaining time stored in the storage unit.

2. The video reception device according to claim 1, wherein the display control information, which the control unit obtains from the video recognition device, includes information indicating a display period of the additional information, and information indicating an offset time.

3. The video reception device according to claim 1, wherein the control unit is configured to perform control of transmitting a plurality of pieces of time stamp information together with the partial video when transmitting the partial video to the video recognition device connected to the communication network.

4. The video reception device according to claim 1, wherein the control unit is configured to perform control of obtaining a plurality of pieces of the additional information including display time range information, from the additional information distribution device based on the result of the video recognition processing, and the additional information display control unit is configured to perform control of displaying the plurality of pieces of the additional information on the displaying unit by switching between the plurality of pieces of the additional information according to the display time range information.

5. A video reception device configured to transmit and receive data through a communication network, the video reception device comprising:
   an input unit configured to receive an input of a video signal;
   a video extraction unit configured to extract a partial video for video recognition processing, from the video signal;
   a control unit configured to perform control of transmitting the partial video to a video recognition device connected to the communication network so as to request the video recognition device to perform the video recognition processing, transmitting a system time at which the video extraction unit extracts the partial video, obtaining a result of the video recognition processing and a display ending time of additional information or a display remaining time of the additional information from the video recognition device, and obtaining additional information based on the result of the video recognition processing from an additional information distribution device connected to the communication network;
   an additional information display control unit configured to perform control of superimposing the additional information on the video signal based on the display ending time or the display remaining time obtained from the video recognition device;
   a displaying unit configured to display a video obtained by superimposing the additional information on the video signal, wherein the additional information display control unit is configured to perform control of hiding the additional information which is being displayed on the displaying unit, based on the display ending time or the display remaining time; and a storage unit configured to store the display ending time or the display remaining time;

wherein the additional information display control unit is configured to perform control of causing the storage unit to store the obtained display ending time or display remaining time, comparing the obtained display ending time or display remaining time and the display ending time or the display remaining time stored in the storage unit every time the video extraction unit extracts the partial video, updating the display ending time or the display remaining time by storing temporally earlier one of the display ending times or the display remaining times in the storage unit, and hiding the additional information which is being displayed on the displaying unit at the display ending time or the display remaining time stored in the storage unit.

6. An additional information display method of a video reception device configured to transmit and receive data through a communication network, the additional information display method comprising:

extracting a partial video for video recognition processing, from a video signal input from an outside;

transmitting the partial video to a video recognition device connected to the communication network so as to request the video recognition device to perform the video recognition processing, and obtaining a result of the video recognition processing and display control information of additional information, from the video recognition device;

obtaining additional information based on the result of the video recognition processing, from an additional information distribution device connected to the communication network;

calculating a display ending time or a display remaining time of the additional information based on a system time at which the partial video is extracted, and the display control information;

performing control of superimposing the additional information on the video signal based on the display ending time or the display remaining time;

displaying, on a displaying unit, a video obtained by superimposing the additional information on the video signal, wherein the additional information which is being displayed on the displaying unit is hidden based on the display ending time or the display remaining time; and storing the display ending time or the display remaining time, wherein the calculated display ending time or display remaining time is stored, the calculated display ending time or display remaining time and the stored display ending time or display remaining time are compared every time the partial video is extracted, the display ending time or the display remaining time is updated by storing temporally earlier one of the display ending times or the display remaining times, and the additional information which is being displayed on the displaying unit is hidden at the stored display ending time or display remaining time of the additional information.

7. The additional information display method according to claim 6, wherein the display control information includes information indicating a display period of the additional information, and information indicating an offset time.

8. The additional information display method according to claim 6, wherein a plurality of pieces of time stamp information are transmitted together with the partial video when the partial video is transmitted to the video recognition device connected to the communication network.

9. The additional information display method according to claim 6, wherein a plurality of pieces of the additional information including display time range information are obtained from the additional information distribution device based on the result of the video recognition processing, and the plurality of pieces of the additional information are displayed on the displaying unit by switching between the plurality of pieces of the additional information according to the display time range information.

10. An additional information display method of a video reception device configured to transmit and receive data through a communication network, the additional information display method comprising:

extracting a partial video for video recognition processing, from a video signal input from an outside;

transmitting the partial video to a video recognition device connected to the communication network so as to request the video recognition device to perform the video recognition processing, transmitting a system time at which the partial video is extracted, and obtaining a result of the video recognition processing and a display ending time of additional information or a display remaining time of the additional information from the video recognition device;

obtaining additional information based on the result of the video recognition processing, from an additional information distribution device connected to the communication network;

performing control of superimposing the additional information on the video signal based on the display ending time or the display remaining time obtained from the video recognition device;

displaying, on a displaying unit, a video obtained by superimposing the additional information on the video signal, wherein the additional information which is being displayed on the displaying unit is hidden based on the display ending time or the display remaining time; and storing the display ending time or the display remaining time, wherein the obtained display ending time or display remaining time is stored, the obtained display ending time or display remaining time and the stored display ending time or display remaining time are compared every time the partial video is extracted, the display ending time or the display remaining time is updated by storing temporally earlier one of the display ending times or the display remaining times, and the additional information which is being displayed on the displaying unit is hidden at the stored display ending time or display remaining time of the additional information.

11. An additional information display system which comprises a video reception device, a video recognition device, and an additional information distribution device, the devices being configured to transmit and receive data to each other through a communication network, wherein the video reception device includes:

an input unit configured to receive an input of a video signal;

a video extraction unit configured to extract a partial video for video recognition processing, from the video signal;

a control unit configured to perform control of transmitting the partial video to the video recognition device through the communication network so as to request the video recognition device to perform the video recognition processing, obtaining a result of the video recognition processing and display control information of additional information from the video recognition device through the communication network, and obtaining additional information based on the result of the video recognition processing from the additional information distribution device through the communication network;

an additional information display control unit configured to perform control of calculating a display ending time or a display remaining time of the additional information based on a system time at which the video extraction unit extracts the partial video, and the display control information, and superimposing the additional information on the video signal based on the display ending time or the display remaining time; and a storage unit configured to store the display ending time or the display remaining time, wherein the video recognition device is configured to receive the partial video transmitted from the video reception device through the communication network, perform the video recognition processing using the partial video, and output the result of the video recognition processing and the display control information to the video reception device through the communication network, wherein the additional information distribution device is configured to transmit additional information corresponding to the result of the video recognition processing received through the communication network, to the video reception device through the communication network, a displaying unit configured to display a video obtained by superimposing the additional information on the video signal, wherein the additional information display control unit is configured to perform control of hiding the additional information which is being displayed on the displaying unit, based on the display ending time or the display remaining time; and wherein the additional information display control unit is configured to perform control of causing the storage unit to store the calculated display ending time or display remaining time, comparing the calculated display ending time or display remaining time and the display ending time or display remaining time stored in the storage unit every time the video extraction unit extracts the partial video, updating the display ending time or the display remaining time by storing temporally earlier one of the display ending times or the display remaining times in the storage unit, and hiding the additional information which is being displayed on the displaying unit at the display ending time or the display remaining time stored in the storage unit.

12. An additional information display system which comprises a video reception device, a video recognition device, and an additional information distribution device, the devices being configured to transmit and receive data to each other through a communication network, wherein the video reception device includes:

an input unit configured to receive an input of a video signal;

a video extraction unit configured to extract a partial video for video recognition processing, from the video signal;

a control unit configured to perform control of transmitting the partial video to the video recognition device through the communication network so as to request the video recognition device to perform the video recognition processing, transmitting a system time at which the video extraction unit extracts the partial video to the video recognition device, obtaining a result of the video recognition processing and a display ending time of additional information or a display remaining time of the additional information from the video recognition device through the communication network, and obtaining additional information based on the result of the video recognition processing from the additional information distribution device through the communication network; and an additional information display control unit configured to perform control of superimposing the additional information on the video signal based on the display ending time or the display remaining time obtained from the video recognition device; and a storage unit configured to store the display ending time or the display remaining time, wherein the video recognition device is configured to receive the partial video and the system time transmitted from the video reception device through the communication network, perform the video recognition processing using the received partial video, output the result of the video recognition processing to the video reception device through the communication network, and transmit the display ending time or the display remaining time based on the system time, to the video reception device through the communication network, wherein the additional information distribution device is configured to transmit the additional information corresponding to the result of the video recognition processing received through the communication network, to the video reception device through the communication network, displaying, on a displaying unit, a video obtained by superimposing the additional information on the video signal, wherein the additional information which is being displayed on the displaying unit is hidden based on the display ending time or the display remaining time; and wherein the additional information display control unit is configured to perform control of causing the storage unit to store the obtained display ending time or display remaining time, comparing the obtained display ending time or display remaining time and the display ending time or the display remaining time stored in the storage unit every time the video extraction unit extracts the partial video, updating the display ending time or the display remaining time by storing temporally earlier one of the display ending times or the display remaining times in the storage unit, and hiding the additional information which is being displayed on the displaying unit at the display ending time or the display remaining time stored in the storage unit.

* * * * *